US012160375B2

(12) United States Patent
Futaki et al.

(10) Patent No.: US 12,160,375 B2
(45) Date of Patent: Dec. 3, 2024

(54) RADIO STATION SYSTEM, RADIO TERMINAL, AND METHODS THEREIN

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/131,103

(22) Filed: Apr. 5, 2023

(65) Prior Publication Data

US 2023/0239086 A1    Jul. 27, 2023

Related U.S. Application Data

(63) Continuation of application No. 17/839,591, filed on Jun. 14, 2022, which is a continuation of application
(Continued)

(30) Foreign Application Priority Data

Jan. 8, 2016 (JP) .................................. 2016-002878

(51) Int. Cl.
*H04L 5/00* (2006.01)
*H04L 69/14* (2022.01)
(Continued)

(52) U.S. Cl.
CPC ............ *H04L 5/001* (2013.01); *H04L 5/0091* (2013.01); *H04L 5/0098* (2013.01); *H04L 69/14* (2013.01);
(Continued)

(58) Field of Classification Search
CPC ..... H04L 5/001; H04L 5/0091; H04L 5/0098; H04L 69/14; H04W 28/0252; H04W 76/27; H04W 80/02; H04W 92/20
See application file for complete search history.

(56) References Cited

U.S. PATENT DOCUMENTS 7,400,636 B2     7/2008 Kim et al.
9,113,450 B2     8/2015 Pelletier ............ H04W 36/0072
(Continued)

FOREIGN PATENT DOCUMENTS

CA    2 535 904 A1    3/2005
CN    1047374 A       6/2015
(Continued)

OTHER PUBLICATIONS

Communication dated May 14, 2019, from the European Patent Office in counterpart European Application No. 16883756.5.
(Continued)

*Primary Examiner* — Fahmida S Chowdhury
(74) *Attorney, Agent, or Firm* — Sughrue Mion, PLLC

(57) ABSTRACT

A radio station (2) transmits configuration information (501) to a radio terminal (1). The configuration information (501) indicates, on a cell-by-cell basis, at least one specific cell on which the radio terminal (1) is allowed to perform at least one of data transmission and data reception on a radio bearer used for uplink transmission or downlink transmission or both via a common Packet Data Convergence Protocol (PDCP) layer (402). As a result, in a radio architecture that provides tight interworking of two different Radio Access Technologies (RATs), it is for example possible to allow an eNB to indicate, to a radio terminal (UE), a specific cell on which the UE should perform uplink transmission.

17 Claims, 15 Drawing Sheets

Related U.S. Application Data

No. 16/991,656, filed on Aug. 12, 2020, now Pat. No. 11,394,502, which is a continuation of application No. 15/781,174, filed as application No. PCT/JP2016/087329 on Dec. 15, 2016, now Pat. No. 10,779,185.

(51) Int. Cl.
| | |
|---|---|
| *H04W 4/00* | (2018.01) |
| *H04W 12/03* | (2021.01) |
| *H04W 12/04* | (2021.01) |
| *H04W 12/041* | (2021.01) |
| *H04W 28/02* | (2009.01) |
| *H04W 76/27* | (2018.01) |
| *H04W 80/02* | (2009.01) |
| *H04W 88/10* | (2009.01) |
| *H04W 92/20* | (2009.01) |
| *H04W 36/00* | (2009.01) |
| *H04W 36/14* | (2009.01) |
| *H04W 48/12* | (2009.01) |

(52) U.S. Cl.
CPC .............. *H04W 4/00* (2013.01); *H04W 12/03* (2021.01); *H04W 12/04* (2013.01); *H04W 12/041* (2021.01); *H04W 28/0252* (2013.01); *H04W 76/27* (2018.02); *H04W 80/02* (2013.01); *H04W 88/10* (2013.01); *H04W 92/20* (2013.01); *H04W 36/00698* (2023.05); *H04W 36/144* (2023.05); *H04W 48/12* (2013.01)

(56) References Cited

U.S. PATENT DOCUMENTS

| | | | |
|---|---|---|---|
| 9,385,862 B2 | 7/2016 | Escott et al. | |
| 10,149,259 B2* | 12/2018 | Sivanesan | H04W 52/365 |
| 10,499,291 B2* | 12/2019 | Ranta-Aho | H04W 36/0066 |
| 10,506,438 B2* | 12/2019 | Yilmaz | H04W 60/005 |
| 2004/0229624 A1 | 11/2004 | Cai | H04L 1/1845 |
| | | | 455/449 |
| 2005/0037767 A1* | 2/2005 | Kim | H04L 69/04 |
| | | | 455/450 |
| 2005/0043050 A1* | 2/2005 | Lee | H04W 72/30 |
| | | | 455/515 |
| 2005/0096017 A1 | 5/2005 | Kim | H04W 4/06 |
| | | | 455/414.1 |
| 2007/0021120 A1* | 1/2007 | Flore | H04W 36/0066 |
| | | | 455/331 |
| 2010/0054472 A1 | 3/2010 | Barany et al. | |
| 2011/0082937 A1 | 4/2011 | Barbaresi | H04W 36/14 |
| | | | 709/226 |
| 2012/0106509 A1* | 5/2012 | Klingenbrunn | H04W 36/22 |
| | | | 370/310 |
| 2012/0106609 A1 | 5/2012 | Klingenbrunn et al. | |
| 2014/0092871 A1 | 4/2014 | Wang et al. | |
| 2014/0169322 A1* | 6/2014 | Ouchi | H04W 52/146 |
| | | | 370/329 |
| 2014/0177531 A1 | 6/2014 | Imamura et al. | |
| 2014/0341013 A1 | 11/2014 | Kumar et al. | |
| 2015/0094073 A1 | 4/2015 | Peng | |
| 2015/0117357 A1 | 4/2015 | Ozturk et al. | |
| 2015/0195796 A1* | 7/2015 | Sivanesan | H04W 52/146 |
| | | | 370/329 |
| 2015/0208235 A1 | 7/2015 | Ingale et al. | |
| 2015/0215987 A1* | 7/2015 | Kim | H04W 76/20 |
| | | | 370/329 |
| 2015/0230212 A1 | 8/2015 | Uchino | H04W 72/0446 |
| | | | 455/552.1 |
| 2015/0271726 A1 | 9/2015 | Kim et al. | |
| 2015/0319641 A1 | 11/2015 | Uchino | H04L 5/001 |
| | | | 455/452.1 |
| 2015/0327107 A1 | 11/2015 | Kim et al. | |
| 2015/0333896 A1 | 11/2015 | Damnjanovic | H04W 74/0808 |
| | | | 370/277 |
| 2015/0334737 A1 | 11/2015 | Susifalval et al. | |
| 2015/0373767 A1* | 12/2015 | Park | H04W 76/15 |
| | | | 370/329 |
| 2016/0094324 A1* | 3/2016 | Lee | H04L 5/0051 |
| | | | 375/267 |
| 2016/0142191 A1* | 5/2016 | Davydov | H04L 1/0029 |
| | | | 370/329 |
| 2016/0150502 A1 | 5/2016 | Sebire | H04W 72/04 |
| | | | 455/450 |
| 2016/0183158 A1 | 6/2016 | Decarreau | H04L 1/1877 |
| | | | 370/328 |
| 2016/0261430 A1* | 9/2016 | Lepp | H04L 12/4641 |
| 2017/0013610 A1* | 1/2017 | Lee | H04W 72/21 |
| 2017/0019930 A1* | 1/2017 | Lee | H04W 72/21 |
| 2017/0150384 A1* | 5/2017 | Rune | H04W 36/0088 |
| 2017/0223538 A1* | 8/2017 | Hahn | H04W 12/04 |
| 2017/0264562 A1* | 9/2017 | Yi | H04L 47/34 |
| 2018/0014247 A1* | 1/2018 | Chandramouli | H04W 48/18 |
| 2018/0020418 A1* | 1/2018 | Chandramouli | H04W 76/16 |
| 2018/0249381 A1* | 8/2018 | Chandrashekar | H04W 74/006 |
| 2021/0307100 A1 | 9/2021 | Talebi Fard | H04W 76/18 |
| 2022/0030659 A1 | 1/2022 | Kim | H04W 24/08 |

FOREIGN PATENT DOCUMENTS

| | | |
|---|---|---|
| CN | 105103810 A | 11/2015 |
| EP | 2 854 444 A1 | 4/2015 |
| EP | 2 919 519 A1 | 9/2015 |
| JP | 2014-131240 A | 7/2014 |
| JP | 2015-523008 A | 8/2015 |
| JP | 2016-156649 A | 8/2015 |
| JP | 2016-524404 A | 8/2016 |
| KR | 10-2010-0089026 A | 8/2010 |
| KR | 10-2015-0093773 A | 8/2015 |
| RU | 2 304 348 C2 | 8/2007 |
| RU | 2012 140 762 A | 3/2014 |
| WO | 2008054668 A2 | 5/2008 |
| WO | 2010/017719 A1 | 2/2010 |
| WO | 2013/143610 A1 | 10/2013 |
| WO | 2014/202353 A1 | 12/2014 |
| WO | 2014190859 A1 | 12/2014 |
| WO | 2015/175195 A1 | 11/2015 |

OTHER PUBLICATIONS

Communication dated May 23, 2018, from the Russian Federal Service for Intellectual Property in counterpart Application No. 2018124781/07.
Communication issued May 26, 2020 by the Japanese Patent Office in application No. 2019-107750.
Icaro Da Silva et al., "Tight integration of new 5G air interface and LTE to fulfill 5G requirements," IEEE 81st, in Vehicular Technology Conference (VTC Spring), May 11-14, 2015, pp. 1-5.
International Search Report of PCT/JP2016/087329 dated Feb. 21, 2017.
3GPP TSG RAN meeting #67, RP-150029, International Telecommunication Union, Radiocommunication Study Groups, Auckland, New Zealand, Jan. 27-Feb. 4, 2015, 118 pages.
3GPP TSG RAN WG2 Meeting #82, R2-131986, "Challenges in the uplink to support dual connectivity," Intel Corporation, Fukuoka, Japan, May 20-25, 2013, 7 pages.
3GPP TSG-RAN Working Group 4 (Radio) Meeting #74bis, R4-151484, "Demodulation test cases for Dual Connectivity," NTT DOCOMO, INC., Rio De Janeiro, Brazil, Apr. 20-24, 2015, 3 pages.
3GPP TSG-RAN WG2#85, R2-140709, "Re-ordering function in PDCP for 3C," Alcatel-Lucent, Alcatel-Lucent Shanghai Bell, Prague, Czech Republic, Feb. 10-14, 2014, 4 pages.
Communication dated Jan. 6, 2019 from Japanese Patent Office in counterpart JP Application No. 2017-580078.
Communication dated Mar. 11, 2019, issued by the Korean Intellectual Property Office in corresponding Korean Application No. 10-2018-7019258.

(56) References Cited

OTHER PUBLICATIONS

Communication issued Aug. 6, 2020 by the Russian Federal Service For Intellectual Property in application No. 2020116191/07.
Chinese Office Action for CN Application No. 201680078414.3 mailed on Oct. 13, 2021 with English Translation.
ETRI, "Discussion on Secondary Cell Change Procedure", 3GPP TSG-RAN2 Meeting #84, R2-134006, Nov. 15, 2013, USA, pp. 1-4.
Extended European Search Report for EP Application No. 22176422.8 dated on Sep. 6, 2022.
Samsung: "Vision and Schedule for 5G Radio Technologies", 3GPP Draft; 3GPP RAN Workshop on 5G, RWS-150039, Sep. 3, 2015.
Japanese Office Action for JP Application No. 2021-202292, mailed on Feb. 14, 2023 with English Translation.
NSN, Nokia Corporation, "On bearer split in uplink", 3GPP TSG-RAN WG2 Meeting #84, R2-133868, Nov. 1, 2013.
Huawei, Hisilicon, "TFT handling for default and dedicated bearer", 3GPP TSG-SA WG2 Meeting #104 S2-142402, Jul. 2, 2014.
Extended European Search Report for EP Application No. 24159783.0, dated on Jun. 6, 2024.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0 (Dec. 2015), pp. 1-295.

\* cited by examiner

Fig. 9

```
DRB-ToAddModList ::=   SEQUENCE (SIZE (1..maxDRB)) OF DRB-ToAddMod
DRB-ToAddMod ::=   SEQUENCE {
  eps-BearerIdentity INTEGER (0..15)
  drb-Identity      DRB-Identity,
  pdcp-Config       PDCP-Config
  rlc-Config        RLC-Config
  logicalChannelIdentity INTEGER (3..10)
  logicalChannelConfig   LogicalChannelConfig
  ...,
  [[ applicable-ServCellList-r1x  Applicable-ServCellList-r1x,      ─── 901
  ]]
}

Applicable-ServCellList-r1x ::= SEQUENCE (SIZE (1..maxServCell-r1x)) OF Applicable-ServCellIndex-r1x
Applicable-ServCellIndex-r1x ::= SEQUENCE {
  servCellIndex-r1x  ServCellIndex-r1x,
  drb-direction-r1x  CHOICE {                                        ─── 903
    bothDirection-r1x  NULL,
    uniDirection-r1x   ENUMERATED { dl, ul }                         ─── 904
  }
}
```
── 902

Fig. 10

```
SCellToAddModList-r10 ::= SEQUENCE (SIZE (1..maxSCell-r10)) OF SCellToAddMod-r10
SCellToAddMod-r10 ::= SEQUENCE {
    sCellIndex-r10          SCellIndex-r10,
    cellIdentification-r10  SEQUENCE {
        physCellId-r10              PhysCellId,
        dl-CarrierFreq-r10ARFCN-ValueEUTRA
    }                       OPTIONAL,  -- Cond SCellAdd
    radioResourceConfigCommonSCell-r10  RadioResourceConfigCommonSCell-r10
    radioResourceConfigDedicatedSCell-r10   RadioResourceConfigDedicatedSCell-r10
...,
[[ available-drbList-r1x    Available-DRBList-r1x                       ─ 1001
]], Available-DRBList-r1x ::= SEQUENCE (SIZE (1..maxDRB)) OF Available-DRB-r1x
Available-DRB-r1x ::= SEQUENCE {
    eps-BearerIdentity-r1x      INTEGER (0..15),         ─ 1003
    drb-identity-r1x            DRB-Identity,            ─ 1004
    drb-direction-r1x           CHOICE {                 ─ 1005
        bothDirection-r1x           NULL,
        uniDirection-r1x            ENUMERATED { dl, ul }
    }
}                                                       ─ 1002
```

|  | LTE BEARER | INTEGRATED BEARER | NEW 5G BEARER |
|---|---|---|---|
| KEY FOR DERIVING TEMPORARY KEYS TO CIPHER/DECIPHER UP AND RRC TRAFFIC | $K_{eNB}$ | | $sub\text{-}K_{eNB}$ |

Fig. 11

| KEY FOR DERIVING TEMPORARY KEYS TO CIPHER/DECIPHER UP AND RRC TRAFFIC | LTE BEARER | LTE CG PART OF INTEGRATED BEARER | NEW 5G CG PART OF INTEGRATED BEARER | NEW 5G BEARER |
|---|---|---|---|---|
| | $K_{eNB}$ | | $sub\text{-}K_{eNB}$ | |

Fig. 12

RADIO STATION SYSTEM, RADIO TERMINAL, AND METHODS THEREIN

CROSS-REFERENCE TO RELATED APPLICATIONS

The present application is a continuation application of U.S. patent application Ser. No. 17/839,591 filed on Jun. 14, 2022, which is a continuation application of U.S. patent application Ser. No. 16/991,656 filed on Aug. 12, 2020, which is issued as U.S. Pat. No. 11,394,502, which is a continuation application of U.S. patent application Ser. No. 15/781,174 filed on Jun. 4, 2018, which is issued as U.S. Pat. No. 10,779,185, which is a National Stage Entry of international application PCT/JP2016/087329 filed on Dec. 15, 2016, which claims the benefit of priority from Japanese Patent Application No. 2016-002878 filed on Jan. 8, 2016, the disclosures of all of which are incorporated in their entirety by reference herein.

TECHNICAL FIELD

The present disclosure relates to communication between a radio station and a radio terminal using a plurality of Radio Access Technologies (RATs).

BACKGROUND ART

The 3rd Generation Partnership Project (3GPP) is starting to work on the standardization for 5G, i.e., 3GPP Release 14, in 2016 to make 5G a commercial reality in 2020. 5G is expected to be realized by continuous enhancement/evolution of LTE and LTE-Advanced and an innovative development by an introduction of a new 5G air-interface (i.e., a new Radio Access Technology (RAT)). The new RAT (i.e., New 5G RAT) supports, for example, frequency bands higher than the frequency bands (e.g., 6 GHz or lower) supported by the LTE/LTE-Advanced and its enhancement/evolution. For example, the new RAT supports centimeter-wave bands (10 GHz or higher) and millimeter-wave bands (30 GHz or higher).

Higher frequency can provide higher-rate communication. However, because of its frequency properties, coverage of the higher frequency is more local. Therefore, high frequencies are used to boost capacity and data rates in specific areas, while wide-area coverage is provided by lower current frequencies. That is, in order to ensure the stability of New 5G RAT communication in high frequency bands, tight integration or interworking between low and high frequencies (i.e., tight integration or interworking between LTE/LTE-Advanced and New 5G RAT) is required. A 5G supporting radio terminal (i.e., 5G User Equipment (UE)) is connected to both of a low frequency band cell and a high frequency band cell (i.e., a LTE/LTE-Advanced cell and a new 5G cell) by using Carrier Aggregation (CA) or Dual Connectivity (DC), or a modified technique thereof.

Non-Patent Literature 1 discloses user-plane and control-plane architectures to use both the LTE air interface (i.e., LTE RAT) and the new 5G air interface (i.e., New 5G RAT). In some implementations, a common Radio Resource Control (RRC) layer and a common Packet Data Convergence Protocol (PDCP) layer (or sublayer) are used. The common PDCP layer is connected to LTE lower layers and New 5G lower layers, and provides an upper layer with a transfer service of user plane data and control plane data through the LTE lower layers and the New 5G lower layers. The LTE lower layers include a Radio Link Control (RLC) layer, a Medium Access Control (MAC) layer, and a physical layer for the LTE-RAT. In a similar way, the New 5G lower layers include an RLC layer, a MAC layer, and a physical layer for the New 5G RAT.

The term "LTE" used in this specification includes enhancements of LTE and LTE-Advanced for 5G to provide tight interworking with the New 5G RAT, unless otherwise indicated. Such enhancements of LTE and LTE-Advanced are also referred to as LTE-Advanced Pro, LTE+, or enhanced LTE (eLTE). Further, the term "5G" or "New 5G" in this specification is used, for the sake of convenience, to indicate an air-interface (RAT) that is newly introduced for the fifth generation (5G) mobile communication systems, and nodes, cells, protocol layers, etc. related to this air-interface. The names of the newly introduced air interface (RAT), and nodes, cells, and protocol layers related thereto will be determined in the future as the standardization work progresses. For example, the LTE RAT may be referred to as Primary RAT (P-RAT or pRAT) or Master RAT. Meanwhile, the New 5G RAT may be referred to as Secondary RAT (S-RAT or sRAT).

CITATION LIST

Non Patent Literature

[Non-Patent Literature 1] Da Silva, I.; Mildh, G.; Rune, J.; Wallentin, P.; Vikberg, J.; Schliwa-Bertling, P.; Rui Fan, "Tight Integration of New 5G Air Interface and LTE to Fulfill 5G Requirements," in Vehicular Technology Conference (VTC Spring), 2015 IEEE 81st, pp. 1-5, 11-14 May 2015

SUMMARY OF INVENTION

Technical Problem

The inventors have studied the 5G radio architecture that provides tight interworking of the LTE RAT and the New 5G RAT and found some problems. For example, there is a problem in the architecture using the common PDCP layer disclosed in Non-Patent Literature 1 that it is difficult for the eNB to indicate, to the UE, a specific cell on which the UE should perform uplink (UL) transmission.

In the existing Dual Connectivity, a Master eNB (MeNB) configures a UE with a link on which UL PDCP Protocol Data Units (PDUs) is to be transmitted. However, the MeNB in DC can only configure the UE with a cell group on which UL PDCP PDUs is to be transmitted. That is, the MeNB in DC can only indicate, to the UE, which one of the Master Cell Group (MCG) and the Secondary Cell Group (SCG) the UE should transmit UL PDCP PDUs on. The MCG is composed of one or more cells provided by the MeNB. The SCG is composed of one or more cells provided by the Secondary (SeNB). In other words, the MeNB in DC cannot indicate, to the UE, which specific cell in the MCG or the SCG the UE should transmit UL PDCP PDUs on.

Accordingly, one of the objects to be attained by embodiments disclosed herein is to provide an apparatus, a method, and a program that allow an eNB to indicate, to a radio terminal (UE), a specific cell on which the UE should perform uplink transmission in a radio architecture that provides tight interworking of two different RATs. It should be noted that this object is merely one of the objects to be attained by the embodiments disclosed herein. Other objects or problems and novel features will be made apparent from the following description and the accompanying drawings.

Solution to Problem

In a first aspect, a radio station system includes one or more radio stations. The one or more radio stations are configured to provide a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks. The one or more radio stations are configured to select from the one or more first cells and the one or more second cells, on a cell-by-cell basis, at least one specific cell on which the radio terminal is allowed to perform at least one of data transmission and data reception on a radio bearer used for uplink transmission or downlink transmission or both via the common PDCP layer. Furthermore, the at least one processor is configured to transmit configuration information indicating the at least one specific cell to the radio terminal.

In a second aspect, a method in a radio station system, including one or more radio stations, includes:
(a) providing a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks;
(b) selecting from the one or more first cells and the one or more second cells, on a cell-by-cell basis, at least one specific cell on which the radio terminal is allowed to perform at least one of data transmission and data reception on a radio bearer used for uplink transmission or downlink transmission or both via the common PDCP layer; and
(c) transmitting configuration information indicating the at least one specific cell to the radio terminal.

In a third aspect, a radio terminal includes a memory and at least one processor coupled to the memory. The at least one processor is configured to provide a first radio protocol stack to communicate with a radio station on one or more first cells in accordance with a first radio access technology, a second radio protocol stack to communicate with the radio station on one or more second cells in accordance with a second radio access technology, and a common Packet Data Convergence Protocol (PDCP) layer associated with both the first and second radio protocol stacks. Further, the at least one processor is configured to receive, from the radio station, configuration information indicating, on a cell-by-cell basis, at least one specific cell on which the radio terminal is allowed to perform at least one of data transmission and data reception on a radio bearer used for uplink transmission or downlink transmission or both via the common PDCP layer. Furthermore, the at least one processor is configured to perform at least one of the data transmission and the data reception on the radio bearer via the at least one specific cell in accordance with the configuration information.

In a fourth aspect, a method in a radio terminal includes:
(a) providing a first radio protocol stack to communicate with a radio station on one or more first cells in accordance with a first radio access technology, a second radio protocol stack to communicate with the radio station on one or more second cells in accordance with a second radio access technology, and a common Packet Data Convergence Protocol (PDCP) layer associated with both the first and second radio protocol stacks;
(b) receiving, from the radio station, configuration information that indicates, on a cell-by-cell basis, at least one specific cell on which the radio terminal is allowed to perform at least one of data transmission and data reception on a radio bearer used for uplink transmission or downlink transmission or both via the common PDCP layer; and
(c) performing at least one of the data transmission and the data reception on the radio bearer via the at least one specific cell in accordance with the configuration information.

In a fifth aspect, a program includes instructions (software codes) that, when loaded into a computer, cause the computer to perform the method according to the above-described second or fourth aspect.

Advantageous Effects of Invention

According to the above-described aspects, it is possible to provide an apparatus, a method, and a program that allow an eNB to indicate, to radio terminal (UE), a specific cell on which the UE should perform uplink transmission in a radio architecture that provides tight interworking of two different RATs.

BRIEF DESCRIPTION OF DRAWINGS

FIG. 9 is a diagram showing one example of information elements used by a base station to indicate to a radio terminal a specific cell used for uplink transmission;

FIG. 10 is a diagram showing one example of information elements used by a base station to indicate to a radio terminal a specific cell used for uplink transmission;

FIG. 11 is a table showing an example of a key used for generation of a temporary key for ciphering/deciphering of each radio bearer according to a second embodiment;

FIG. 12 is a table showing an example of a key used for generation of a temporary key for ciphering/deciphering of each radio bearer according to the second embodiment;

DESCRIPTION OF EMBODIMENTS

Specific embodiments are described hereinafter in detail with reference to the drawings. The same or corresponding elements are denoted by the same reference symbols throughout the drawings, and repetitive descriptions are avoided for clarity.

Each of embodiments described below may be used individually, or two or more of the embodiments may be appropriately combined with one another. These embodiments include novel features different from one another. Accordingly, these embodiments contribute to achieving objects or solving problems different from one another and contribute to obtaining advantages different from one another.

The following descriptions on the embodiments mainly focus on specific examples with regard to the 5G radio architecture that provides tight interworking of the LTE RAT and the New 5G RAT. However, these embodiments are not limited to being applied to the 5G radio architecture and may also be applied to other radio architectures that provide tight interworking of two different RATs.

First Embodiment

Figure 1:
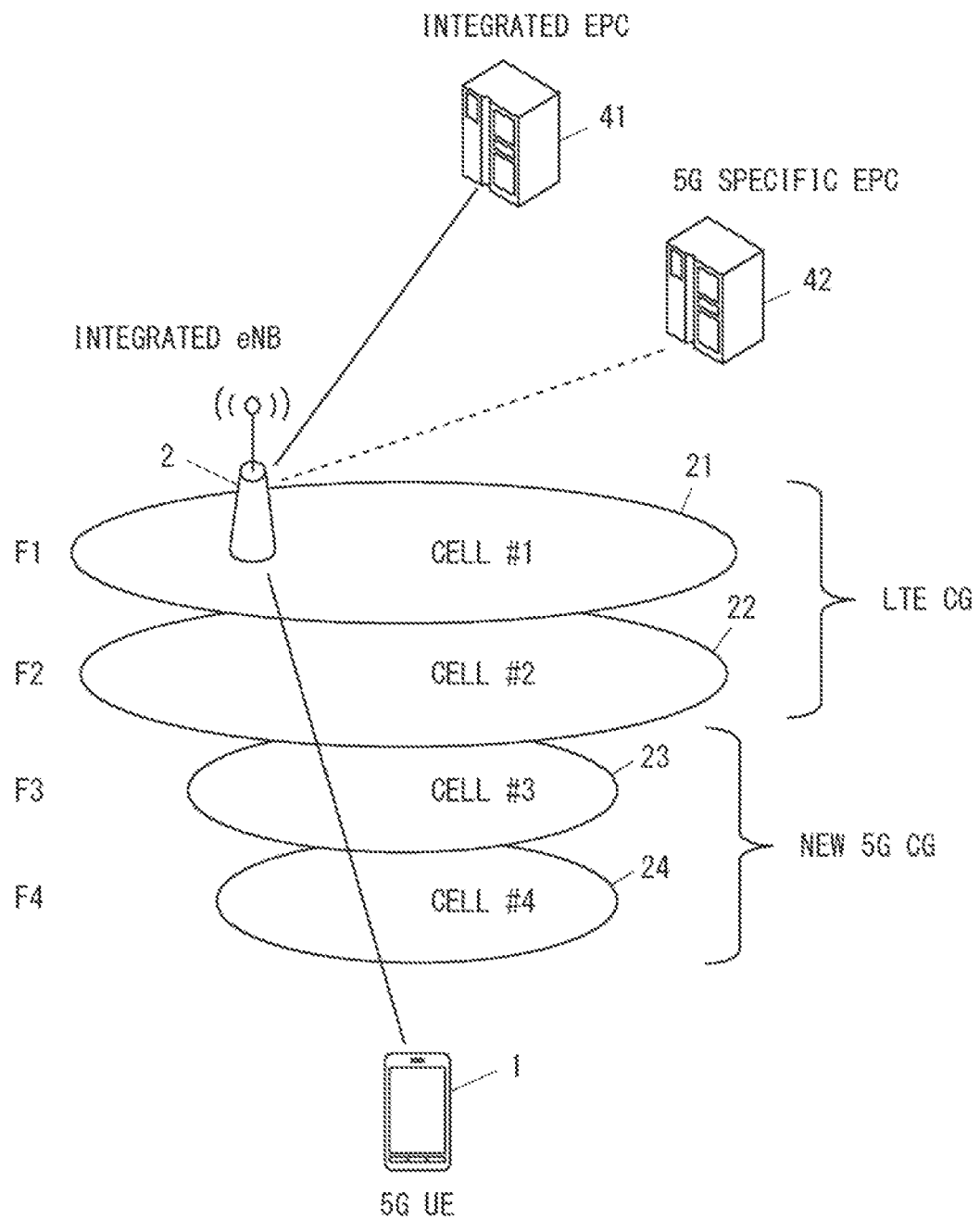
FIG. 1 is a diagram showing a configuration example of a radio communication network according to several embodiments.

FIG. 1 shows a configuration example of a radio communication network according to several embodiments including this embodiment. In the example shown in FIG. 1, the radio communication network includes a radio terminal (UE) 1 and an integrated base station (i.e., integrated eNB) 2. The UE 1 is a 5G UE and connects to both one or more LTE cells (e.g., cells 21 and 22) and one or more New 5G cells (e.g., cells 23 and 24) using CA, DC, or an enhancement thereof. In the following description, one or more LTE cells are referred to as an LTE cell group (CG) and one or more New 5G cells used by the 5G UE 1 are referred to as a New 5G CG. Each of the cells in the LTE CG and New 5G CG has been configured for the 5G UE 1 by the integrated eNB 2 and has been activated by the integrated eNB 2. In some implementations, frequency bands (e.g., F1 and F2) of the LTE CG (e.g., the cells 21 and 22) are lower frequency bands (e.g., lower than 6 GHz) and frequency bands (e.g., F3 and F4) of the New 5G CG (e.g., the cells 23 and 24) are higher frequency bands (e.g., higher than 6 GHz).

The integrated eNB 2 supports 5G and provides a plurality of cells that use a plurality of component carriers (CCs) having different frequencies and using different RATs. In the example shown in FIG. 1, the integrated eNB 2 provides LTE cells 21 and 22 and New 5G cells 23 and 24. The integrated eNB 2 communicates with the 5G UE 1 via both the LTE CG (e.g., the cells 21 and 22) and the New 5G CG (e.g., the cells 23 and 24) using CA, DC, or an enhancement thereof. Further, the integrated eNB 2 is connected to a core network, that is, an integrated Evolved Packet Core (i.e., integrated EPC) 41. The integrated EPC 41 provides LTE core network functions and 5G new core network functions. In some implementations, the integrated eNB 2 may be connected to a 5G specific core network (i.e., 5G specific EPC 42).

Figure 2:
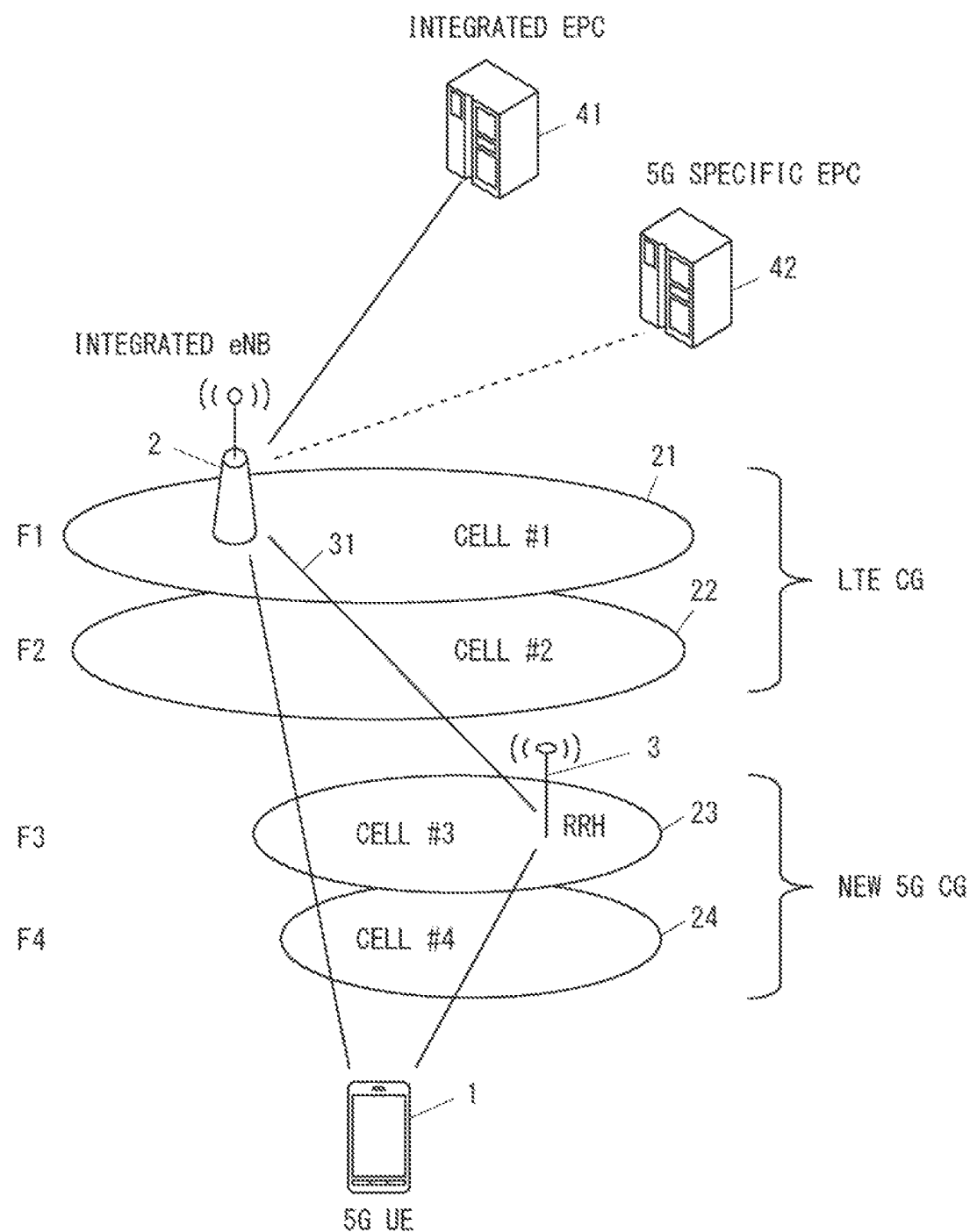
FIG. 2 is a diagram showing a configuration example of the radio communication network according to the several embodiments.

As shown in FIG. 2, a remote radio unit 3 may be used to provide at least one of the cells of the integrated eNB 2 (e.g., New 5G cells 23 and 24). In the configuration shown in FIG. 2, the integrated eNB 2 performs digital signal processing regarding uplink and downlink signals, and meanwhile the radio unit 3 performs analog signal processing of the physical layer. For example, the integrated eNB 2 and the radio unit 3 are connected to each other by an optical fiber, and a digital baseband signal is transferred through this optical fiber in accordance with the Common Public Radio Interface (CPRI) standard. The configuration shown in FIG. 2 is referred to as a Cloud Radio Access Network (C-RAN). The radio unit 3 is referred to as a Remote Radio Head (RRH) or a Remote Radio Equipment (RRE). The integrated eNB 2 that performs baseband digital signal processing is referred to as a Baseband Unit (BBU). Further, information about any one of the layers 1, 2, and 3 (or a signal containing this information) may be transferred using a fronthaul (interface) that is to be standardized by, for example, 3GPP or Small Cell Forum. For example, a form in which the fronthaul connects between the L1 and the L2 or between Sub-layers in the L2 is also referred to as L2 C-RAN. In this case, the integrated eNB 2 and the RRH 3 shown in FIG. 2 are also referred to as a Digital Unit (DU) and a Radio Unit (RU), respectively.

In the configuration examples shown in FIGS. 1 and 2, the LTE radio protocol and the New 5G radio protocol are implemented in one node (i.e., the integrated eNB 2). Accordingly, the configuration examples shown in FIGS. 1 and 2 are referred to as co-located deployments or co-located RAN. In the case of the L2 C-RAN configuration, a part of the New 5G radio protocol may be deployed in the RU. However, in another configuration example, non co-located deployments or non co-located RAN may be employed. In the Non co-located deployments, the LTE radio protocol and the New 5G radio protocol are provided by two nodes (eNBs) different from each other. These two nodes are installed, for example, at two different sites geographically spaced apart from each other.

Figure 3:
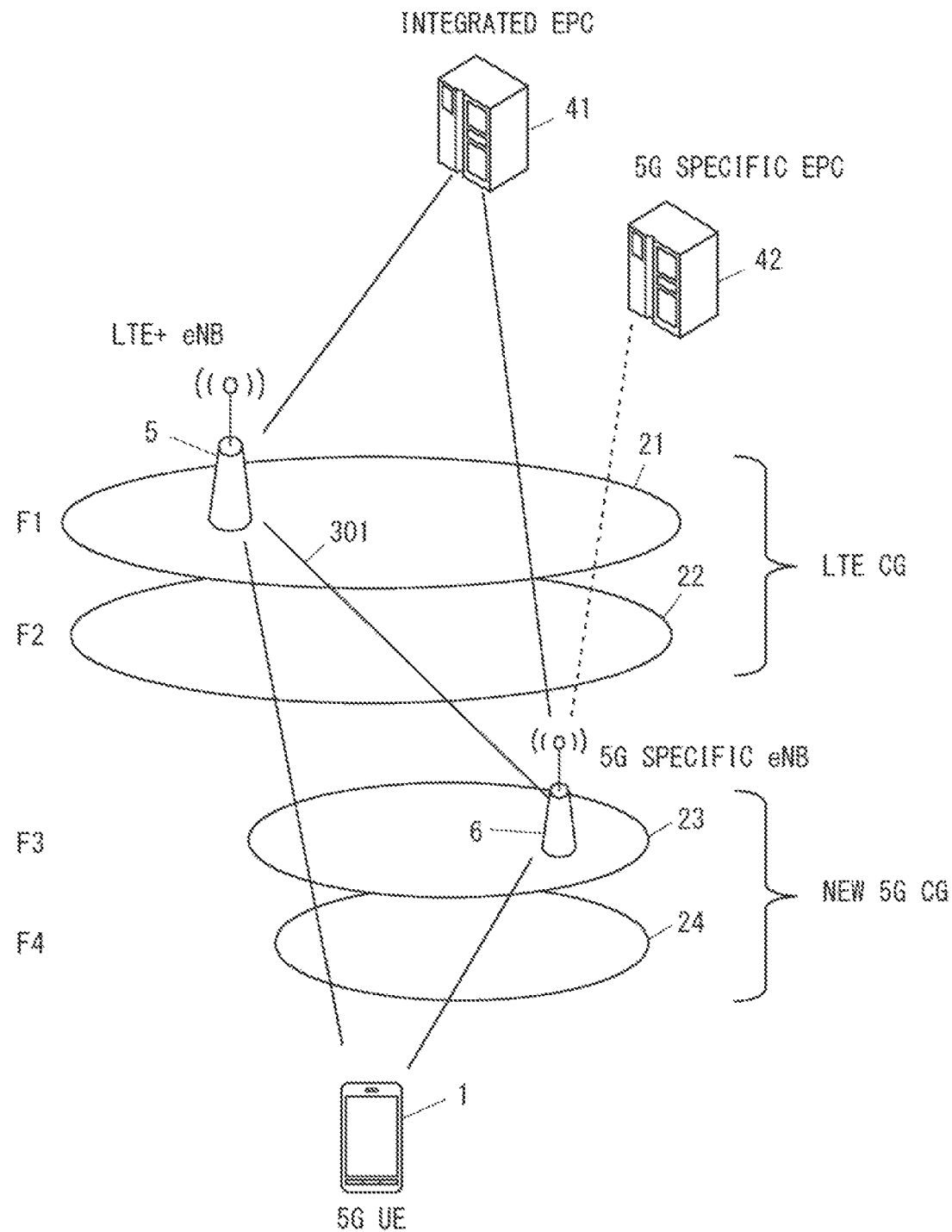
FIG. 3 is a diagram showing another configuration example of the radio communication network according to the several embodiments.

FIG. 3 shows an example of the non co-located deployments of the radio communication network according to several embodiments including this embodiment. In the example shown in FIG. 3, the radio communication network includes a 5G UE 1, an LTE+ eNB 5, and a 5G specific eNB 6. The LTE+ eNB 5 provides an LTE CG (e.g., the cells 21 and 22) and the 5G specific eNB 6 provides a New 5G CG (e.g., the cells 23 and 24). The LTE+ eNB 5 is connected to the 5G specific eNB 6 by a communication line, such as an optical fiber link or a point-to-point radio link, and communicates with the 5G specific eNB 6 on an inter-base-station interface 301 (e.g., enhanced X2 interface). The LTE+ eNB 5 and the 5G specific eNB 6 interwork with each other to enable the 5G UE 1 to connect to both the LTE CG and the 5G CG using CA, DC, or an enhancement thereof.

Figure 4:
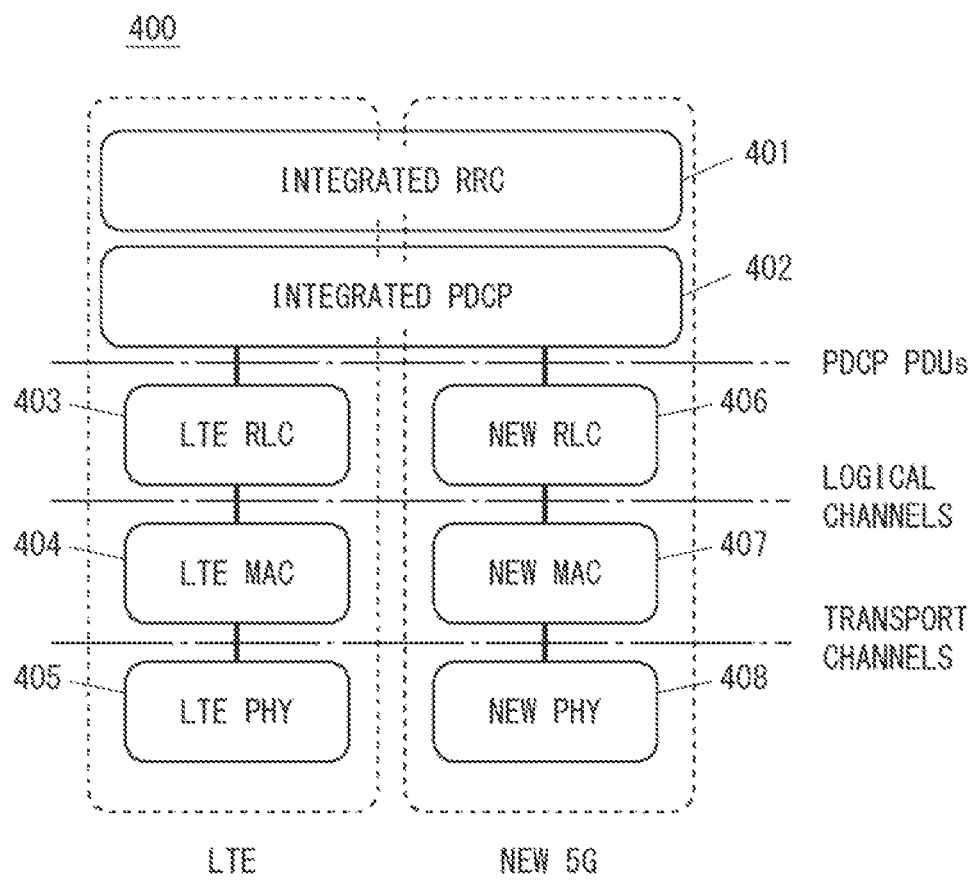
FIG. 4 is a diagram showing an example of a radio protocol stack according to the several embodiments.

FIG. 4 shows one example of the radio protocol stack supported by the 5G UE 1 and the integrated eNB 2. A radio protocol stack 400 shown in FIG. 4 includes a unified (or integrated) RRC layer 401 and a unified (or integrated) PDCP layer (or sublayer) 402. The integrated RRC layer 401 and the integrated PDCP layer 402 may also be referred to as a common RRC layer and a common PDCP layer, respectively. The radio protocol stack 400 further includes LTE lower layers and New 5G lower layers. The LTE lower layers include an LTE RLC layer 403, an LTE MAC layer 404, and an LTE PHY layer 405. The New 5G lower layers include a New RLC layer 406, a New MAC layer 407, and a New PHY layer 408. In the case of using the integrated eNB 2, some of the functions of the LTE PHY layer 405 (e.g., analog signal processing) may be provided by an RRH for LTE. In a similar way, some of the functions of the New PHY layer 408 (e.g., analog signal processing) may be provided by an RRH for New 5G. Further, in the case of using the above-described L2 C-RAN configuration, some of the functions of the New PHY layer, the New MAC layer, or the New RLC layer (and the functions of layers lower than it) may be provided by an RU for New 5G.

The integrated RRC layer 401 provides control-plane functions in the LTE RAT and the New 5G RAT. The main services and functions provided by the integrated RRC layer 401 include the following:

Transmission of system information for non-access stratum (NAS) and access stratum (AS);
Paging;
Establishment, maintenance, and release of RRC connections;
Security functions including key management;
Configuration, maintenance, and release of radio bearers;
Configuration of lower layer protocols (i.e., PDCP, RLC, MAC, and PHY);
QoS management;
UE measurement report and configuration thereof; and
Transfer of NAS messages between a UE and a core network.

The integrated RRC layer 401 communicates with the integrated PDCP layer 402 to perform management of radio bearers, control of ciphering/deciphering of data of the user plane (i.e., data radio bearers), control of ciphering/deciphering of data (i.e., RRC PDUs) of the control plane (i.e., signalling radio bearers), and control of integrity protection of data (i.e., RRC PDUs) of the control plane (i.e., signalling radio bearers). Further, the integrated RRC layer 401 controls the LTE RLC layer 403, the LTE MAC layer 404, and the LTE PHY layer 405, and also controls the New RLC layer 406, the New MAC layer 407, and the New PHY layer 408.

The integrated PDCP layer 402 provides an upper layer with transfer services of data of data radio bearers and signalling radio bearers. The integrated PDCP layer 402 receives services from the LTE RLC layer 403 and the New RLC layer 406. That is, the integrated PDCP layer 402 is provided with a transfer service of PDCP PDUs through the LTE RAT by the LTE RLC layer 403 and is provided with a transfer service of PDCP PDUs through the New 5G RAT by the New RLC layer 406.

Figure 5:
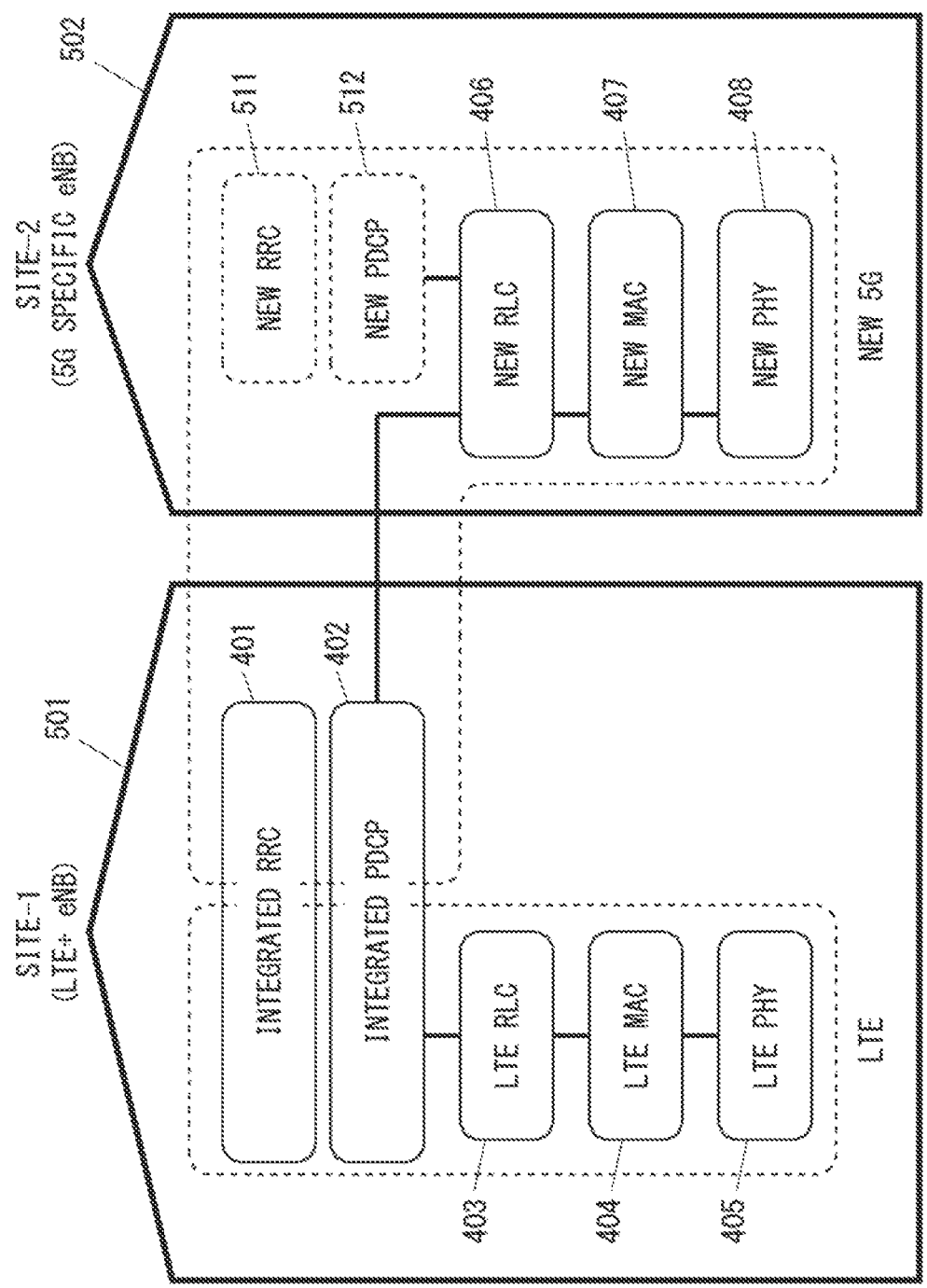
FIG. 5 is a diagram showing an example of the radio protocol stack according to the several embodiments.

It should be noted that the radio protocol stack 400, which uses the integrated PDCP layer 402, shown in FIG. 4 can be applied not only to the co-located deployments (e.g., FIGS. 1 and 2) but also to the non co-located deployments (e.g., FIG. 3). That is, as shown in FIG. 5, in the non co-located deployments, the LTE+ eNB 5 is arranged in a site 501 and provides the integrated RRC layer 401, the integrated PDCP layer 402, the LTE RLC layer 403, the LTE MAC layer 404, and the LTE PHY layer 405. In contrast, the 5G specific eNB 6 is arranged in another site 502 and provides the New RLC layer 406, the New MAC layer 407, and the New PHY layer 408.

In some implementations, the 5G specific eNB 6 used in the non co-located deployments may include a New RRC layer 511 and a New PDCP layer 512. Further, the 5G specific eNB 6 may include a control interface or connection (e.g., an S1-MME interface or an S1-U interface) with a core network (e.g., the integrated EPC 41 or the 5G specific EPC 42) for the 5G UE 1. In some implementations, the New RRC layer 511 may configure the lower layers 406-408 of the New 5G CG (e.g., New 5G cells 23 and 24) and transmit system information (i.e., Master Information Block (MIB), or System Information Blocks (SIBs), or both) via the New 5G CG. The New RRC layer 511 may configure a signalling radio bearer with the 5G UE 1, also configure the lower layers 406-408 of the New 5G CG (e.g., the New 5G cells 23 and 24) and the New PDCP layer 512, and then transmit or receive RRC messages to or from the 5G UE 1 through the New 5G CG. The New RRC layer 511 may transfer NAS messages between the core network (e.g., the integrated EPC 41 or the 5G specific EPC 42) and the 5G UE 1. The New PDCP layer 512 provides the New RRC layer 511 with a transfer service of RRC messages via the New 5G lower layers 406-408.

The New RRC layer 511 may depend on the integrated RRC layer 401 (i.e., have a dependency relationship) or may perform control similar to that performed by the integrated RRC layer 401 (i.e., have a similar function). In the former case (i.e., dependency relationship), the 5G specific eNB 6 (or the New RRC layer 511 thereof) may generate RRC configuration information with respect to a New 5G cell(s) (i.e., New 5G CG) in response to an instruction or a request from the LTE+ eNB 5 (or the integrated RRC layer 401 thereof). The 5G specific eNB 6 (or the New RRC layer 511 thereof) may transmit this RRC configuration information to the LTE+ eNB 5 (or the integrated RRC layer 401 thereof) and the LTE+ eNB 5 may transmit an RRC message containing this RRC configuration information (e.g., an RRC Connection Reconfiguration message) to the 5G UE 1 on an LTE cell (i.e., LTE CG). Alternatively, the 5G specific eNB 6 (or the New RRC layer 511 thereof) may transmit an RRC message containing this RRC configuration information to the 5G UE 1 on a New 5G cell.

The 5G UE 1 may support the protocol stack shown in FIG. 4 or support another protocol stack to communicate with the radio network shown in FIG. 5. For example, the 5G UE 1 may have an RRC layer (i.e., a master RRC layer or a primary RRC layer) corresponding to the integrated RRC layer 401 of the LTE+ eNB 5 and an auxiliary RRC layer (i.e., a sub RRC layer or a secondary RRC layer) corresponding to the New RRC layer 511 of the 5G specific eNB 6. For example, the sub RRC layer may perform one or both of transmission and reception (or one or both of generation and restoration) of a part of the RRC configuration information controlled by the master RRC layer. The 5G UE 1 may receive both the RRC configuration information regarding a LTE cell(s) (i.e., LTE CG) and the RRC configuration information regarding a New 5G cell(s) (i.e., New 5G CG) through an LTE cell or through a New 5G cell. Alternatively, the 5G UE 1 may receive the RRC configuration information regarding a LTE cell(s) (i.e., LTE CG) through an LTE cell and meanwhile receive the RRC configuration information regarding a New 5G cell(s) (i.e., New 5G CG) through a New 5G cell.

The radio protocol stack shown in FIG. 4 is merely one example and, alternatively, the 5G UE 1 and the integrated eNB 2 may support another protocol stack. For example, in FIG. 4, the integrated PDCP layer 402 integrates (or allows interworking of) the LTE lower layers and the New 5G lower layers. Alternatively, an integrated MAC layer may be used to integrate (or allow interworking of) the LTE PHY layer 405 and the New PHY layer 408.

Figure 6:
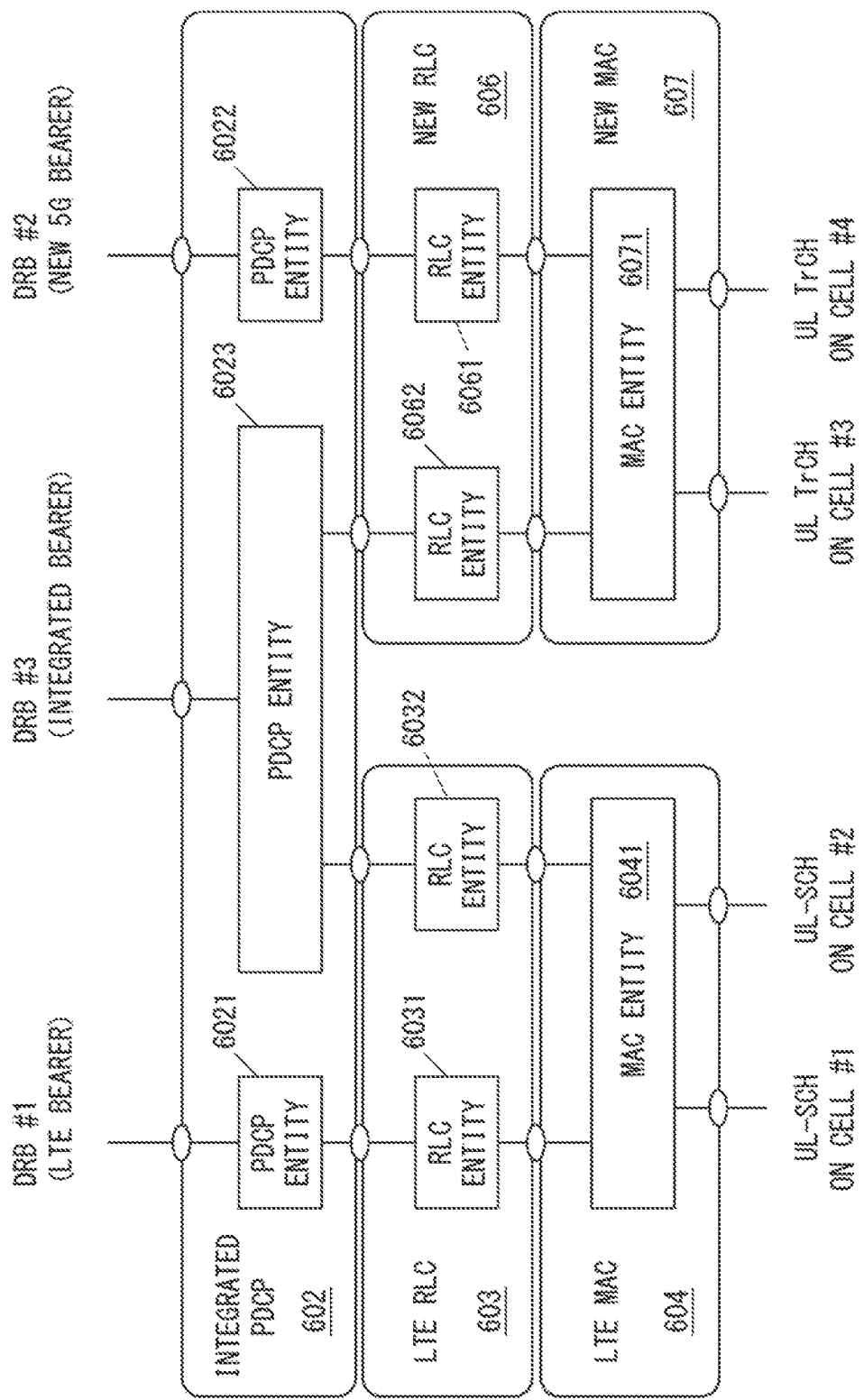
FIG. 6 is a diagram showing an example of a layer-2 structure for uplink according to the several embodiments.

FIG. 6 shows one example of the layer-2 structure for uplink according to the several embodiments. An integrated PDCP layer 602, an LTE RLC layer 603, an LTE MAC layer 604, a New RLC layer 606, and a New MAC layer 607 shown in FIG. 6 respectively correspond to the integrated PDCP layer 402, the LTE RLC layer 403, the LTE MAC layer 404, the New RLC layer 406, and the New MAC layer 407 shown in FIGS. 4 and 5.

The integrated PDCP layer 602 includes one or more PDCP entities. Each PDCP entity transports data of one radio bearer. Each PDCP entity is associated with either the user plane or the control plane depending on which radio bearer (i.e., a data radio bearer (DRB) or a signalling radio bearer (SRB)) it transports data from. In the example shown in FIG. 6, the integrated PDCP layer 602 includes three PDCP entities 6021, 6022, and 6023 that correspond to three data radio bearers DRB #1, DRB #2, and DRB #3, respectively.

The data of the DRB #1 is transmitted from the 5G UE 1 to the integrated eNB 2 (or the LTE+ eNB 5) via the LTE RAT on the LTE CG (e.g., the LTE cells 21 and 22). Accordingly, the DRB #1 may be hereinafter referred to as an LTE bearer. The DRB #1 is similar to an MCG bearer in LTE Release 12 DC.

The data of the DRB #2 is transmitted from the 5G UE 1 to the integrated eNB 2 (or the 5G specific eNB 6) via the New 5G RAT on the New 5G CG (e.g., the New 5G cells 23 and 24). Accordingly, the DRB #2 may be hereinafter referred to as a New 5G bearer. When the data is transmitted on the New 5G CG managed by the 5G specific eNB 6, the DRB #2 is similar to an SCG bearer in LTE Release 12 DC. Alternatively, when the data is transmitted on the New 5G CG managed by the integrated eNB 2, the DRB #2 may be similar to a bearer on the SCG side of a split bearer in LTE Release 12 DC.

The DRB #3 is similar to a split bearer in LTE Release 12 DC. That is, the DRB #3 is associated with both of one logical channel of the LTE RAT and one logical channel of the New 5G RAT to use both the resources of the LTE CG and the resources of the New 5G CG. In the case of the user data, the logical channel of the LTE RAT is a Dedicated Traffic Channel (DTCH). The logical channel of the New 5G RAT is a 5G logical channel for the user data that corresponds to the DTCH. The DRB #3 may be hereinafter referred to as a split bearer or a unified bearer (an integrated bearer).

In the case of uplink transmission by the 5G UE 1, the PDCP entity 6021 generates PDCP PDUs from data of the DRB #1 (i.e., LTE bearer) and sends these PDCP PDUs to an LTE RLC entity 6031. In the case of uplink reception by the integrated eNB 2 (or the LTE+ eNB 5), the PDCP entity 6021 receives RLC SDUs (i.e., PDCP PDUs) from the LTE RLC entity 6031 and sends data of the DRB #1 to the upper layer.

In the case of uplink transmission by the 5G UE 1, the PDCP entity 6022 generates PDCP PDUs from data of the DRB #2 (i.e., New 5G bearer) and sends these PDCP PDUs to a New RLC entity 6061. In the case of uplink reception by the integrated eNB 2 (or the 5G specific eNB 6), the PDCP entity 6022 receives RLC SDUs (i.e., PDCP PDUs) from the New RLC entity 6061 and sends data of the DRB #2 to the upper layer.

In the case of uplink transmission by the 5G UE 1, the PDCP entity 6023 generates PDCP PDUs from data of the DRB #3 (i.e., integrated bearer) and routes these PDCP PDUs to an LTE RLC entity 6032 or a New RLC entity 6062. In the case of uplink reception by the integrated eNB 2 (or the LTE+ eNB 5 and the 5G specific eNB 6), the PDCP entity 6023 reorders PDCP PDUs (i.e., RLC SDUs) received from the LTE RLC entity 6032 and from the New RLC entity 6062, and then sends data of the DRB #3 to the upper layer.

Each RLC entity in the LTE RLC layer 603 and the New RLC layer 606 is configured, by the integrated RRC entity (i.e., the RRC entity 401 shown in FIG. 4), with RLC Acknowledged Mode (RLC AM) data transfer or RLC Unacknowledged Mode (RLC UM) data transfer, and then provides a transfer service of PDCP PDUs. In the case of uplink transmission by the 5G UE 1, each RLC entity in the LTE RLC layer 603 generates RLC PDUs (i.e., data of one logical channel) from PDCP PDUs (i.e., RLC SDUs) and sends these RLC PDUs to a MAC entity 6041 in the LTE MAC layer 604. In a similar way, each RLC entity in the New RLC layer 606 generates RLC PDUs (i.e., data of one logical channel) from PDCP PDUs (i.e., RLC SDUs) and sends them to a MAC entity 6071 in the New MAC layer 607.

In the example shown in FIG. 6, one MAC entity 6041 is used for two LTE cells (i.e., LTE CG) configured for one 5G UE 1. In the case of uplink transmission by the 5G UE 1, the MAC entity 6041 multiplexes RLC PDUs (i.e., MAC SDUs), which belong to the two logical channels from the two RLC entities 6031 and 6032, into two transport blocks per Transmission Time Interval (TTI). The two transport blocks per TTI are sent to the LTE physical layer 405 through two UL transport channels (i.e., UL-SCHs) corresponding to the two LTE cells 21 and 22.

In a similar way, one MAC entity 6071 is used for two New 5G cells (i.e., New 5G CG) configured for one 5G UE 1. In the case of uplink transmission by the 5G UE 1, the MAC entity 6071 multiplexes RLC PDUs (i.e., MAC SDUs), which belong to two logical channels from two RLC entities 6071 and 6072, into two transport blocks per Transmission Time Interval (TTI). The two transport blocks per TTI are sent to the physical layer 408 for New 5G through two UL transport channels (i.e., UL TrCHs) corresponding to the two New 5G cells 23 and 24.

Further, in this embodiment, the integrated eNB 2 is configured to indicate, to the 5G UE 1, a specific cell on which the 5G UE 1 is allowed to perform at least one of data transmission and data reception on a radio bearer used for uplink transmission or downlink transmission or both via the common PDCP layer. For example, the integrated eNB 2 may be configured to indicate, to the 5G UE 1, a specific cell on which the 5G UE 1 should perform uplink (UL) transmission.

In some implementations, the integrated eNB 2 selects, on a cell-by-cell basis, from one or more LTE cells (e.g., the LTE cells 21 and 22) and one or more New 5G cells (e.g., the New 5G cells 23 and 24) that have been configured for the 5G UE 1 (and have been activated), at least one specific cell on which the 5G UE 1 is allowed to transmit data of an UL radio bearer, which is a radio bearer at least used for uplink transmission. Then the integrated eNB 2 transmits configuration information indicating the selected specific cell to the 5G UE 1. In other words, the configuration information indicates at least one specific cell on which the 5G UE 1 is allowed to transmit UL PDCP PDUs (which is generated from data of the UL radio bearer by the integrated PDCP layer 402 or 602). The operation to configure (e.g., Addition/Modification) the 5G UE 1 with the specific cell on which data of the UL radio bearer (UL PDCP SDUs or PDUs) is to be transmitted is herein referred to as "Cell-specific bearer mapping". When the non co-located deployments are used, the LTE+ eNB 5 or the 5G specific eNB 6 performs operations for "Cell-specific bearer mapping" in place of the integrated eNB 2.

Figure 7:
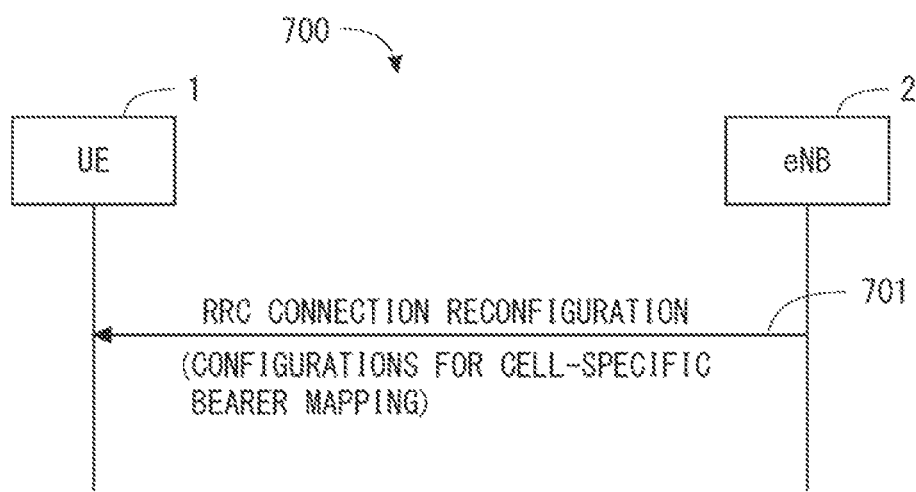
FIG. 7 is a sequence diagram showing one example of operations of a radio terminal and a base station according to a first embodiment.

In some implementations, the configuration information, which notifies the 5G UE 1 of the specific cell for the UL transmission, may be included in an RRC message. FIG. 7 shows one example (Process 700) of an operation of transmitting the configuration information. In Step 701, the integrated eNB 2 transmits to the 5G UE 1 an RRC Connection Reconfiguration message containing the configuration information for the cell-specific bearer mapping. FIG. 7 is merely one example. For example, the configuration information may be included in another RRC message (e.g., an RRC Connection Setup message). When the non co-located deployments are used, the LTE+ eNB 5 that provides the integrated RRC layer 401 may perform the transmission in Step 701.

In other implementations, the 5G specific eNB 6 may send to the LTE+ eNB 5, using an inter-node message (e.g., SCG-Config), configuration information for the cell-specific bearer mapping about the New 5G cell, and the LTE+ eNB 5 then may transmit this configuration information to the 5G UE 1. Alternatively, the 5G specific eNB 6 may transmit, to the 5G UE 1, an RRC Connection Reconfiguration message containing the configuration information for the cell-specific bearer mapping about the New 5G cell. In these cases, the 5G specific eNB 6 may have an RRC layer to manage the New 5G cell (that is, to perform RRC configuration).

Figure 8:
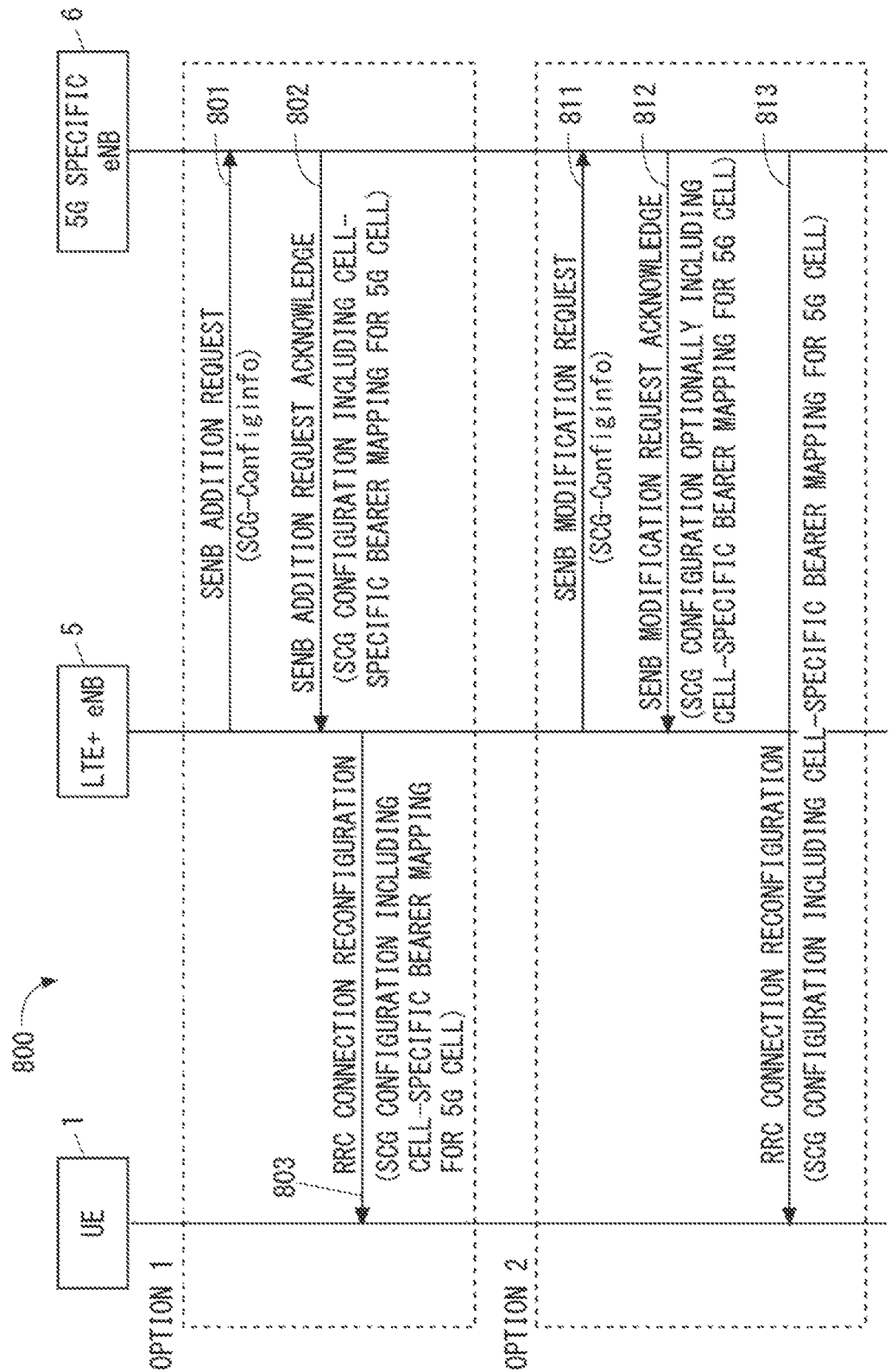
FIG. 8 is a sequence diagram showing one example of operations of the radio terminal and the base station according to the first embodiment.

FIG. 8 shows one example of an operation of transmitting the configuration information for the cell-specific bearer mapping about the New 5G cell. The example shown in FIG. 8 reuses an X2AP message and an RRC IE used for information exchange between eNBs in Dual Connectivity (DC). In Option 1 shown in FIG. 8, in Step 801, the LTE+ eNB 5 sends to the 5G specific eNB 6, using an SENB ADDITION REQUEST message, DC configuration information (e.g., SCG-ConfigInfo) required for DC. In Step 802, the 5G specific eNB 5 sends to the LTE+ eNB 5 an SENB ADDITION REQUEST ACKNOWLEDGE message containing the configuration information for the cell-specific bearer mapping about the 5G cell (e.g., Cell-specific bearer mapping for 5G cell). In Step 803, the LTE+ eNB 5 transmits an RRC Connection Reconfiguration message containing this configuration information to the 5G UE 1.

In contrast, in Option 2 shown in FIG. 8, in Step 811, the LTE+ eNB 5 sends to the 5G specific eNB 6, using an SENB MODIFICATION REQUEST message, DC configuration information (e.g., SCG-ConfigInfo) required for DC. In Step 812, the 5G specific eNB 6 sends an SENB MODIFICATION REQUEST ACKNOWLEDGE message to the LTE+ eNB 5. In Step 813, the 5G specific eNB 6 transmits to the 5G UE 1 an RRC Connection Reconfiguration message containing the configuration information for the cell-specific bearer mapping about the 5G cell (e.g., Cell-specific bearer mapping for the 5G cell). Note that, in Step 812, the 5G specific eNB 6 may send the configuration information for the cell-specific bearer mapping about the 5G cell (e.g., Cell-specific bearer mapping for 5G cell) to the LTE+ eNB 4. Although the Options 1 and 2 shown in the example of FIG. 8 uses the SENB ADDITION REQUEST procedure and the SENB MODIFICATION procedure, respectively, each of the Options 1 and 2 may use any one of these two procedures and may use another procedure (e.g., SeNB Change or Inter-MeNB handover) and another message (e.g., SENB MODIFICATION REQUIRED). For example, when the SeNB Change is alternatively used, the 5G UE 1 may perform a Random Access Procedure with a Target 5G specific eNB (not shown) on the specific cell indicated by the configuration information for the cell-specific bearer mapping about the 5G cell (e.g., Cell-specific bearer mapping for 5G cell).

In one example, the configuration information may include a bearer configuration regarding an UL radio bearer(s). In this case, the bearer configuration includes an indication of the specific cell on which the 5G UE 1 is allowed to transmit data of the UL radio bearer(s). The bearer configuration may indicate that only uplink, only downlink, or both uplink and downlink is/are targeted.

The following description provides a specific example of the method of configuring the 5G UE 1 with a relationship (or mapping) between a UL radio bearer and a cell(s) on which data of the UL radio bearer is to be transmitted. FIG. 9 shows one example of information elements (IEs) used by the integrated eNB 2, the LTE+ eNB 5, or the 5G specific eNB 6 to indicate to the 5G UE 1 the specific cell to be used for UL transmission. Specifically, FIG. 9 shows a modification of the drb-toAddModList IE contained in the RRC Connection Reconfiguration message. The drb-toAddModList IE includes a list of the data radio bearers to be added (or modified) to the 5G UE 1. The "applicable-ServCellList" (901) shown in FIG. 9 indicates a list of serving cells on which the 5G UE is allowed to transmit DRB data, with regard to each DRB to be added or modified. The "applicable-ServCellList" (901) includes one or more serving cell identifiers (ServCellIndex (903)), as shown in the "applicable-ServCellList" IE (902). Further, the "applicable-ServCellList" IE (902) may include an information element (e.g., drb-direction (904)) indicating the target bearer direction (i.e., only uplink, only downlink, or both uplink and downlink).

In another example, the configuration information may include cell configuration regarding at least one serving cell. In this case, the cell configuration indicates whether the 5G UE 1 is allowed to transmit data of each UL radio bearer in each serving cell. This cell configuration may indicate that only uplink, only downlink, or both uplink and downlink is/are targeted. Further, a cell(s) on which the 5G UE 1 is allowed to receive data of a DL radio bearer(s), which is a radio bearer to be used for at least downlink transmission, may be the same as or different from the cell(s) on which the data transmission about the UL radio bearer(s) is allowed.

FIG. 10 shows an example of information elements (IEs) used by the integrated eNB 2, the LTE+ eNB 5, or the 5G specific eNB 6 to indicate to the 5G UE 1 the specific cell to be used for UL transmission. Specifically, FIG. 10 shows a modification of the SCellToAddModList IE contained in the RRC Connection Reconfiguration message. The SCellToAddModList IE includes a list of the secondary cells (SCell(s)) to be added (or modified) to the 5G UE 1. The "available-drbList" (1001) shown in FIG. 10 indicates a list of DRBs which the 5G UE is allowed to transmit on the secondary cell, with regard to each of the secondary cells to be added or modified. The "available-drbList" (1001) includes one or more DRB identifiers (e.g., DRB-Identity (1004)), as shown in the "available-drbList" IE (1002). Further, the "available-drbList" IE (1001) may include an information element (e.g., drb-direction (1005)) indicating the target bearer direction (i.e., only uplink, only downlink, or both uplink and downlink). The information element indicating the bearer direction may be configured only when the RLC AM mode is applied to the bearer. Further, the "available-drbList" IE (1001) may include an Evolved Packet System (EPS) bearer identifier (e.g., eps-BearerIdentity (1003)).

The 5GCellToAddModList IE may be defined separately from the CellToAddModList IE. The 5GCellToAddModList IE indicates a list of 5G Cell(s) to be added (or modified) to the 5G UE 1. In this case, the "available-drbList" (1001) may be included in the 5GCellToAddModList IE, in place of the SCellToAddModList IE. The 5GCellToAddModList IE may be transmitted on an RRC message (e.g., an RRC Connection Reconfiguration message or an RRC Connection Setup message) together with the SCellToAddModList IE, or in place of the SCellToAddModList IE.

As in the above-described examples described with reference to FIGS. 9 and 10, to use the RRC configuration to configure the UE 1 with the relationship (or mapping) between each UL radio bearer and a cell(s) on which data of the UL radio bearer is to be transmitted provides the following advantages, for example. Even when UL radio bearers are mapped to different combinations of specific cells, the RRC configuration is able to easily specify the mapping, as shown in the examples in FIGS. 9 and 10. For example, when a UL radio bearer #A is mapped to cells #a and #b and, meanwhile, a UL radio bearer #B is mapped to cells #b and #c, the RRC configuration can specify these mappings in accordance with the examples shown in FIGS. 9 and 10.

Next, a specific example of operations of the 5G UE 1 will be described. In response to the indication from the integrated eNB 2, the LTE+ eNB 5, or the 5G specific eNB 6, the 5G UE 1 restricts a cell(s) to be used to transmit each UL radio bearer. Specifically, the integrated RRC layer 401 of the 5G UE 1 controls the integrated PDCP layer 602 (402), the LTE MAC layer 604 (404), and the New MAC layer 607 (407) so as to specify a cell(s) to be used to transmit each UL radio bearer, in accordance with the indication from the integrated eNB 2, the LTE+ eNB 5, or the 5G specific eNB 6.

The control on the integrated PDCP layer 602 includes indicating which one of the LTE RLC layer 603 and the New RLC layer 606 the PDCP entity 6023 should send UL PDCP PDUs of the integrated radio bearer (or integrated bearer) should send to. The PDCP entity 6023 routes the UL PDCP PDUs of the integrated radio bearer to either the RLC entity 6032 for LTE or the RLC entity 6062 for New 5G, in accordance with the indication from the integrated RRC layer 601.

The control on each MAC layer includes indicating a specific cell which the MAC entity should multiplex RLC PDUs from each RLC entity (that is associated with one radio bearer) into an uplink transport block of. For example, in response to receiving from the integrated RRC layer 401 the indication indicating that data of the DRB #1 is to be transmitted on the LTE cell 21 (i.e., Cell #1), the MAC entity 6041 for LTE operates to multiplex the RLC PDUs from the RLC entity 6031 into the UL transport block to be sent to the physical layer corresponding to the LTE cell 21 (i.e., Cell #1), and operates not to multiplex the RLC PDUs from the RLC entity 6031 into the UL transport block to be sent to the physical layer corresponding to the LTE cell 22 (i.e., Cell #2). In a similar way, in response to receiving the indication indicating that data of the DRB #3 (i.e., integrated bearer) is to be transmitted on the LTE cell 22 (i.e., Cell #2), the MAC entity 6041 for LTE operates to multiplex the RLC PDUs from the RLC entity 6032 to the UL transport block to be sent to the physical layer corresponding to the LTE cell 22 (i.e., Cell #2).

As will be understood from the above description, in this embodiment, the integrated eNB 2 is configured to transmit, to the 5G UE 1, configuration information indicating, on a cell-by-cell basis, at least one specific cell that the 5G UE 1 should use to transmit the data of each UL radio bearer. In other words, the integrated eNB 2 indicates whether transmission of the data of each UL radio bearer is valid (or allowed) for each cell that has been configured for the 5G UE 1 and has been activated. Meanwhile, the 5G UE 1 is configured to transmit data (i.e., uplink PDCP PDUs) of each UL radio bearer through the specific cell(s) indicated by the integrated eNB 2 in accordance with the configuration information received from the integrated eNB 2. Accordingly, it allows the integrated eNB 2 to indicate, to the 5G UE 1, the specific cell(s) on which the 5G UE 1 should perform the UL transmission in the 5G radio architecture that provides tight interworking of the LTE RAT and the New 5G RAT.

The integrated eNB 2 may configure, for example, N LTE cells and M New 5G cells in the 5G UE 1 as serving cells. Here, N and M are each an integer greater than or equal to 2. In this case, the integrated eNB 2 may select n LTE cells and m New 5G cells as the specific cells that are allowed to be used to transmit the data of an UL radio bearer. Here, n is a positive integer smaller than N and m is a positive integer smaller than M.

When the non co-located deployments are used, the LTE+ eNB 5 or the 5G specific eNB 6 transmits to the 5G UE 1 the configuration information indicating, on a cell-by-cell basis, at least one specific cell to be used to transmit the data of an UL radio bearer(s). The 5G UE 1 transmits data (i.e., uplink PDCP PDUs) of each UL radio bearer through the indicated specific cell(s) in accordance with the configuration information received from the LTE+ eNB 5 or the 5G specific eNB 6. Accordingly, it allows the LTE+ eNB 5 or the 5G specific eNB 6 to indicate, to the 5G UE 1, the specific cell(s) on which the 5G UE 1 should perform the UL transmission in the 5G radio architecture that provides tight interworking of the LTE RAT and the New 5G RAT.

In this embodiment, the descriptions have been mainly given in regard to the UL radio bearer. However, in some implementations, the integrated eNB 2, the LTE+ eNB 5, or the 5G specific eNB 6 may transmit, to the 5G UE 1, configuration information indicating, on a cell-by-cell basis, at least one specific cell on which the 5G UE 1 is allowed to be used to receive data of a downlink (DL) radio bearer(s). The 5G UE 1 may receive data (i.e., DL PDCP PDUs) of each DL radio bearer through the indicated specific cell(s) in accordance with the configuration information received from the integrated eNB 2, the LTE+ eNB 5, or the 5G specific eNB 6. The cell(s) on which the 5G UE 1 is allowed to receive data of the DL radio bearer(s) may be the same as or different from the cell on which the data of the UL radio bearer(s) is allowed to be transmitted.

In this embodiment, the 5G UE 1 may transmit a Scheduling Request (SR) and a Buffer Status Report (BSR) as follows. In some implementations, the 5G UE 1 may determine the cell on which an SR and a BSR are to be transmitted, in accordance with the relationship (or mapping) between each radio bearer and a cell(s) on which the data of the radio bearer is to be transmitted. That is, in order to request the integrated eNB 2 (or the LTE+ eNB 5 or the 5G specific eNB 6) for radio resource allocation to transmit data of an uplink radio bearer (i.e., a radio bearer used at least for uplink transmission), the 5G UE 1 may transmit an SR and a BSR in the specific cell that corresponds to the mapping of this uplink radio bearer. Alternatively, the 5G UE 1 may transmit an SR or a BSR or both in any cell included in the cell group (CG) to which the specific cell corresponding to the mapping of this uplink radio bearer belongs. Alternatively, the 5G UE 1 may transmit an SR or a BSR or both in any cell with which the 5G UE 1 has been configured with UL (i.e., cell configured with UL).

In this embodiment, when at least one or all of the one or more cells in which a radio bearer has been mapped (or configured) is/are released, the 5G UE 1 may autonomously disable the corresponding mapping. Further, in a fall back operation, the UE 1 may transmit data of the radio bearer through any cell (in response to the reception of the UL grant). Meanwhile, the integrated eNB 2 (or the LTE+ eNB 5 or the 5G specific eNB 6) may disable the mapping and perform the reception operation corresponding to the fall back operation in the 5G UE 1. In this case, the integrated eNB 2 (or the LTE+ eNB 5 or the 5G specific eNB 6) may send to at least one core network node (e.g., MME) a message that triggers the change in the bearer configuration in the core network (e.g., the integrated EPC 41 or the 5G specific EPC 42).

Second Embodiment

The examples of a radio communication network and a radio protocol stack according to this embodiment are similar to those shown in FIGS. 1 to 6. In this embodiment, selection of a key $K_{eNB}$ to derive temporary keys (e.g., $K_{UPenc}$, $K_{RRCin}$) used by each PDCP entity in the PDCP layer 602 (402) will be described. These temporary keys are used by each PDCP entity, for example, to cipher and decipher the user plane (UP) traffic and the RRC traffic. These temporary keys are derived from the key $K_{eNB}$ by the 5G UE 1 and the integrated eNB 2 (or the LTE+ eNB 5).

In some implementations, the 5G UE 1 and the integrated eNB 2 (or the LTE+ eNB 5) may use the first key $K_{eNB}$ to cipher and decipher data of a radio bearer(s) of a certain bearer type and use the second key sub-$K_{eNB}$ to cipher and decipher data of a radio bearer(s) of another bearer type. The second key sub-$K_{eNB}$ may be derived from the first key $K_{eNB}$, similar to the key S-$K_{eNB}$ used for SCG bearers in Dual Connectivity (DC). As shown in FIG. 11, for example, the 5G UE 1 and the integrated eNB 2 (or the LTE+ eNB 5) may use the first key $K_{eNB}$ to cipher and decipher data of LTE bearers (e.g., the DRB #1 shown in FIG. 6) and integrated bearers (e.g., the DRB #3 shown in FIG. 6) and use the second key sub-$K_{eNB}$ to cipher and decipher data of New 5G bearers (e.g., the DRB #2 shown in FIG. 6).

In some implementations, the 5G UE 1 and the integrated eNB 2 (or the LTE+ eNB 5) may select the key based on the relationship (or mapping) between each radio bearer and a cell(s) on which the data of the radio bearer is to be transmitted. Specifically, as shown in FIG. 12, the 5G UE 1 and the integrated eNB 2 (or the LTE+ eNB 5) may use the first key $K_{eNB}$ to cipher and decipher data of radio bearers transmitted through the LTE CG and use the second key sub-$K_{eNB}$ to cipher and decipher data of radio bearers transmitted via the New 5G CG. In the example shown in FIG. 12, the first key $K_{eNB}$ is used to cipher and decipher data of an integrated bearer when this data is transmitted on the LTE CG, and the second key sub-$K_{eNB}$ is used to cipher and decipher data of an integrated bearer when this data is transmitted on the New 5G CG.

Third Embodiment

The examples of a radio communication network and a radio protocol stack according to this embodiment are similar to those shown in FIGS. 1 to 6. In this embodiment, an operation of transmitting UL PDCP PDUs of an integrated UL radio bearer (e.g., the DRB #3 in FIG. 6) by the 5G UE 1 will be described.

Figure 13:
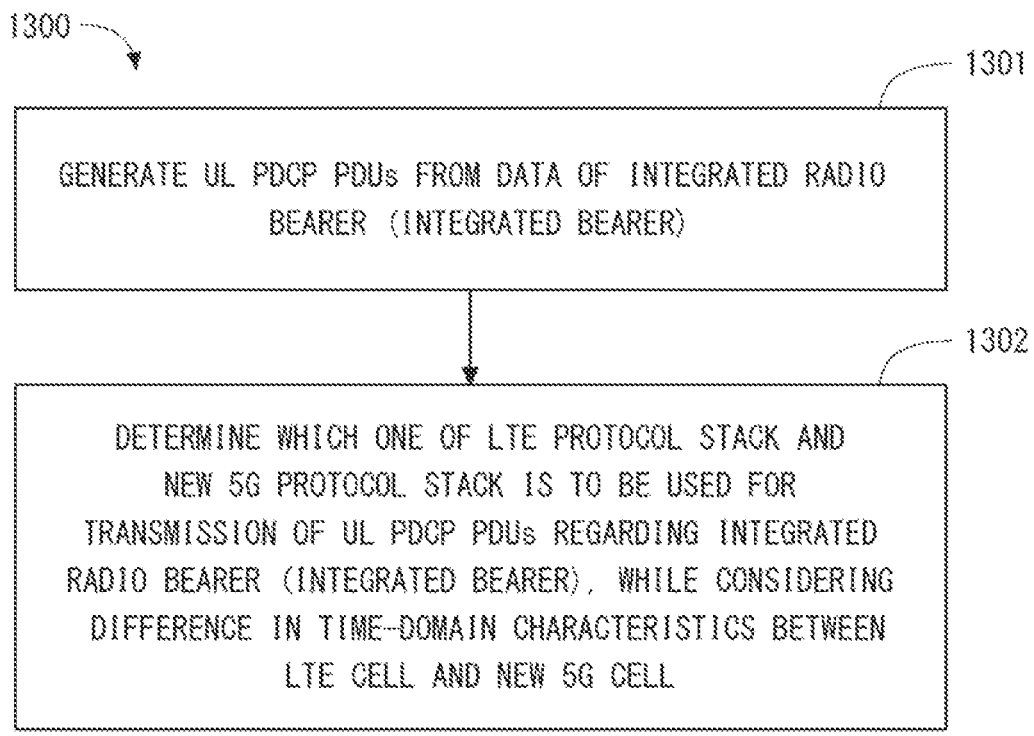
FIG. 13 is a flowchart showing one example of operations of a radio terminal according to a third embodiment.

FIG. 13 is a flowchart showing one example (Process 1300) of operations of the 5G UE 1 (i.e., the integrated PDCP layer 602) according to this embodiment. In Step 1301, the 5G UE 1 (the integrated PDCP layer 602) generates UL PDCP PDUs from data of an integrated UL radio bearer. In Step 1302, the 5G UE 1 (the integrated PDCP layer 602) determines which one of the LTE protocol stack (e.g., the LTE RLC layer 603 and the LTE MAC layer 604) and the New 5G protocol stack (e.g., the New RLC layer 606 and the New MAC layer 607) is to be used for transmission of the UL PDCP PDUs, while considering the difference in time-domain characteristics between the LTE cell and the New 5G cell. The time-domain characteristics include, for example, at least one of a TTI length, a subframe length, and a latency time from the UL grant reception to the UL transmission.

For example, if at least one of the TTI length, the subframe length, and the latency time of the New 5G cell is shorter than that of the LTE cell, the 5G UE 1 may preferentially use the New 5G cell. This is particularly beneficial when the size of the data to be transmitted (e.g., UL PDCP PDU) is small. Alternatively, when at least one of the TTI length and the subframe length of the LTE cell is longer than that of the New 5G cell, the 5G UE 1 may preferentially use the LTE cell. This may be beneficial when, for example, the size of the data to be transmitted is large.

Further or alternatively, the time-domain characteristics may include a difference in subframe structure or in frame structure between the LTE cell and the New 5G cell. For example, with regard to the subframe of the New 5G cell, at least two of an uplink (or downlink) physical control channel (e.g., PUCCH or PDCCH), a downlink (or uplink) physical control channel, and an uplink (or downlink) physical data channel (e.g., PUSCH or PDSCH) may be time-multiplexed into one subframe (e.g., in this order). In this case, it is expected that the aforementioned latency time from the UL grant reception to the UL transmission will become shorter.

Further, different New 5G cells may have different characteristics. For example, the 5G UE 1 can use a plurality of New 5G cells having different characteristics when the 5G UE 1 has been configured with CA or DC and the plurality of cells has been activated. In this case, the 5G UE 1 may determine a cell(s) on which data (e.g., UL PDCP PDUs) is to be transmitted in consideration of the characteristics in time domain of these New 5G cells. The difference in the characteristics among these New 5G cells may be, for example, a difference in TTI length due to a difference in subframe structure or in Numerology (e.g., subcarrier spacing, sampling rate). Alternatively, it may be regarding whether a method for reducing a latency until the uplink data transmission (e.g., Semi-Persistent Scheduling, Contention-based PUSCH transmission) is applied to the respective New 5G cells (i.e., whether the method is configured in the 5G UE 1).

In a first example, the amount (total) of pending UL data is taken into account. When the amount (total) of the pending UL data (i.e., UL PDCP PDUs or SDUs) is smaller than a first threshold indicated by the integrated eNB 2 (or the LTE+ eNB 5), the 5G UE 1 may transmit UL data on the New 5G cell. That is, the integrated PDCP layer 602 (or the PDCP entity 6023) of the 5G UE 1 sends UL PDCP PDUs to the New MAC layer 607 (or the MAC entity 6071) via the New RLC layer 606 (or the RLC entity 6062).

Further or alternatively, when the amount (total) of the pending UL data (i.e., UL PDCP PDUs or SDUs) exceeds a second threshold indicated by the integrated eNB 2 (or the LTE+ eNB 5), the 5G UE 1 may transmit UL data on the LTE cell. That is, the integrated PDCP layer 602 (or the PDCP entity 6023) of the 5G UE 1 sends UL PDCP PDUs to the LTE MAC layer 604 (or the MAC entity 6041) via the LTE RLC layer 603 (or the RLC entity 6032).

The first threshold may be the same as the second threshold. Alternatively, the first threshold may be smaller than the second threshold. In this case, when the amount (total) of the pending UL data is larger than the first threshold but smaller than the second threshold, the 5G UE 1 may transmit UL data as appropriate on a cell(s) on which the UL grant has been received.

In a second example, the packet size (per packet) of the pending UL data is taken into account. The packet size may be, for example, any one of the PDCP-SDU size, the PDCP-PDU size, and the IP-packet size. The pending UL data may include UL data to which a PDCP SN has been allocated and that is stored in the UL PDCP buffer, and it may further include UL data to which a PDCP SN has not yet been allocated. When the packet size of the pending UL data (e.g., UL PDCP SDUs) is smaller than a third threshold indicated by the integrated eNB 2 (or the LTE+ eNB 5), the 5G UE 1 may transmit this UL data on the New 5G cell. That is, the integrated PDCP layer 602 (or the PDCP entity 6023) of the 5G UE 1 sends UL PDCP PDUs to the New MAC layer 607 (or the MAC entity 6071) via the New RLC layer 606 (or the RLC entity 6062).

Further or alternatively, when the packet size of the pending UL data (e.g., UL PDCP SDUs) exceeds a fourth threshold indicated by the integrated eNB 2 (or the LTE+ eNB 5), the 5G UE 1 may transmit this UL data on the LTE cell. That is, the integrated PDCP layer 602 (or the PDCP entity 6023) of the 5G UE 1 sends UL PDCP PDUs to the LTE MAC layer 604 (or the MAC entity 6041) via the LTE RLC layer 603 (or the RLC entity 6032).

The third threshold may be the same as the fourth threshold. Alternatively, the third threshold may be smaller than the fourth threshold. In this case, when the packet size of the pending UL data is larger than the third threshold but smaller than the fourth threshold, the 5G UE 1 may transmit this UL data as appropriate on a cell(s) on which the UL grant has been received.

In a third example, the difference in TTI between the 5G RAT and the LTE RAT is taken into account. As one example, it is assumed a case in which the TTI of the 5G RAT (e.g., 0.2 ms TTI) is shorter than the TTI of the LTE RAT (i.e., 1 ms). In this case, the 5G UE 1 may preferentially use the New 5G RAT over the LTE RAT to transmit PDCP PDUs regarding an integrated UL radio bearer. In some implementations, in response to receiving UL grants in both the LTE cell and the New 5G cell substantially at the same timing, the integrated PDCP layer 602 (or the PDCP entity 6023) of the 5G UE 1 first sends UL PDCP PDUs to the New MAC layer 607 (or the MAC entity 6071) via the New RLC layer 606 (the RLC entity 6062) in accordance with the UL grant in the New 5G cell. If there are pending UL PDCP PDUs, the integrated PDCP layer 602 (or the PDCP entity 6023) of the 5G UE 1 further sends UL PDCP PDUs to the LTE MAC layer 604 (or the MAC entity 6041) via the LTE RLC layer 603 (or the RLC entity 6032) in accordance with the UL grant in the LTE cell.

Alternatively, the 5G UE 1 may preferentially use the LTE RAT over the New 5G RAT to transmit PDCP PDUs regarding an integrated UL radio bearer. Further, in order to transmit a Dedicated Scheduling Request (D-SR) and an SRB, the 5G UE 1 may perform a process similar to the above-described transmission of UL PDCP PDUs.

The reception of UL grants in both the LTE cell and the New 5G cell substantially at the same timing may be reception of UL grants in the same subframe (or the same TTI). Alternatively, the reception of UL grants substantially at the same timing may be determined depending on whether the PDCP layer 602 receives notifications regarding the reception of an UL grant from both the lower layer of the LTE and the lower layer of the New 5G in the same subframe (or the same TTI). Alternatively, the reception of UL grants substantially at the same timing may be determined depending on whether the PDCP layer 602 can transmit UL data of the same subframe (or at the same time).

Figure 14:
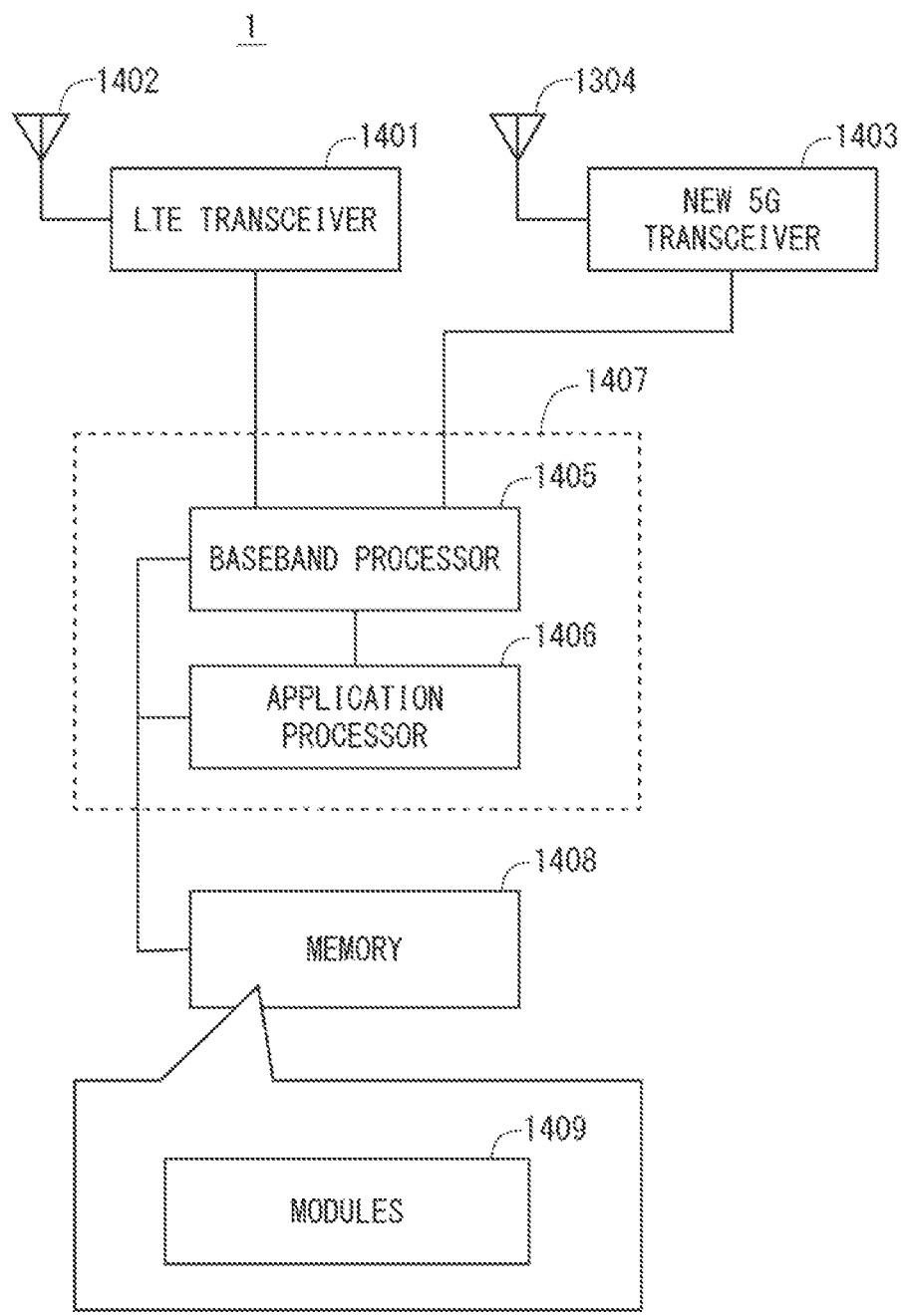
FIG. 14 is a block diagram showing a configuration example of a radio terminal according to the several embodiments.

In the following, configuration examples of the 5G UE 1, the integrated eNB 2, the LTE+ eNB 5, and the 5G specific eNB 6 according to the above embodiments will be described. FIG. 14 is a block diagram showing a configuration example of the 5G UE 1. An LTE transceiver 1401 performs analog RF signal processing regarding the PHY layer of the LTE RAT to communicate with the integrated eNB 2 (or the LTE+ eNB 5). The analog RF signal processing performed by the LTE transceiver 1401 includes frequency up-conversion, frequency down-conversion, and amplification. The LTE transceiver 1401 is coupled to an antenna 1402 and a baseband processor 1405. That is, the LTE transceiver 1401 receives modulated symbol data (or OFDM symbol data) from the baseband processor 1405, generates a transmission RF signal, and supplies the transmission RF signal to the antenna 1402. Further, the LTE transceiver 1401 generates a baseband reception signal based on a reception RF signal received by the antenna 1402, and supplies the baseband reception signal to the baseband processor 1405.

A New 5G transceiver 1403 performs analog RF signal processing regarding the PHY layer of the New 5G RAT to communicate with the integrated eNB 2 (or the 5G specific eNB 6). The New 5G transceiver 1403 is coupled to an antenna 1404 and the baseband processor 1405.

The baseband processor 1405 performs digital baseband signal processing (i.e., data-plane processing) and control-plane processing for radio communication. The digital baseband signal processing includes (a) data compression/de-compression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signalling regarding attach, mobility, and packet communication).

In the case of LTE and LTE-Advanced, for example, the digital baseband signal processing performed by the baseband processor 1405 may include signal processing of a Packet Data Convergence Protocol (PDCP) layer, a Radio Link Control (RLC) layer, a MAC layer, and a PHY layer. Further, the control plane-processing performed by the baseband processor 1405 may include processing of a Non-Access Stratum (NAS) protocol, an RRC protocol, and MAC CEs.

The baseband processor 1405 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1406 described in the following.

The application processor 1406 is also referred to as a CPU, an MPU, a microprocessor, or a processor core. The application processor 1406 may include a plurality of processors (processor cores). The application processor 1406 loads a system software program (Operating System (OS)) and various application programs (e.g., communication application that acquires metering data or sensing data) from a memory 1408 or from another memory (not shown) and executes these programs, thereby providing various functions of the 5G UE 1.

In some implementations, as represented by a dashed line (1407) in FIG. 14, the baseband processor 1405 and the application processor 1406 may be integrated on a single chip. In other words, the baseband processor 1405 and the application processor 1406 may be implemented in a single System on Chip (SoC) device 1407. An SoC device may be referred to as a system Large Scale Integration (LSI) or a chipset.

The memory 1408 is a volatile memory, a non-volatile memory, or a combination thereof. The memory 1408 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1408 may include, for example, an external memory device that can be accessed from the baseband processor 1405, the application processor 1406, and the SoC 1407. The memory 1408 may include an internal memory device that is integrated in the baseband processor 1405, the application processor 1406, or the SoC 1407. Further, the memory 1408 may include a memory in a Universal Integrated Circuit Card (UICC).

The memory 1408 may store one or more software modules (computer programs) 1409 including instructions and data to perform the processing by the 5G UE 1 described in the above embodiments. In some implementations, the baseband processor 1405 or the application processor 1406 may load these software modules 1409 from the memory 1408 and execute the loaded software modules, thereby performing the processing of the 5G UE 1 described in the above embodiments.

Figure 15:
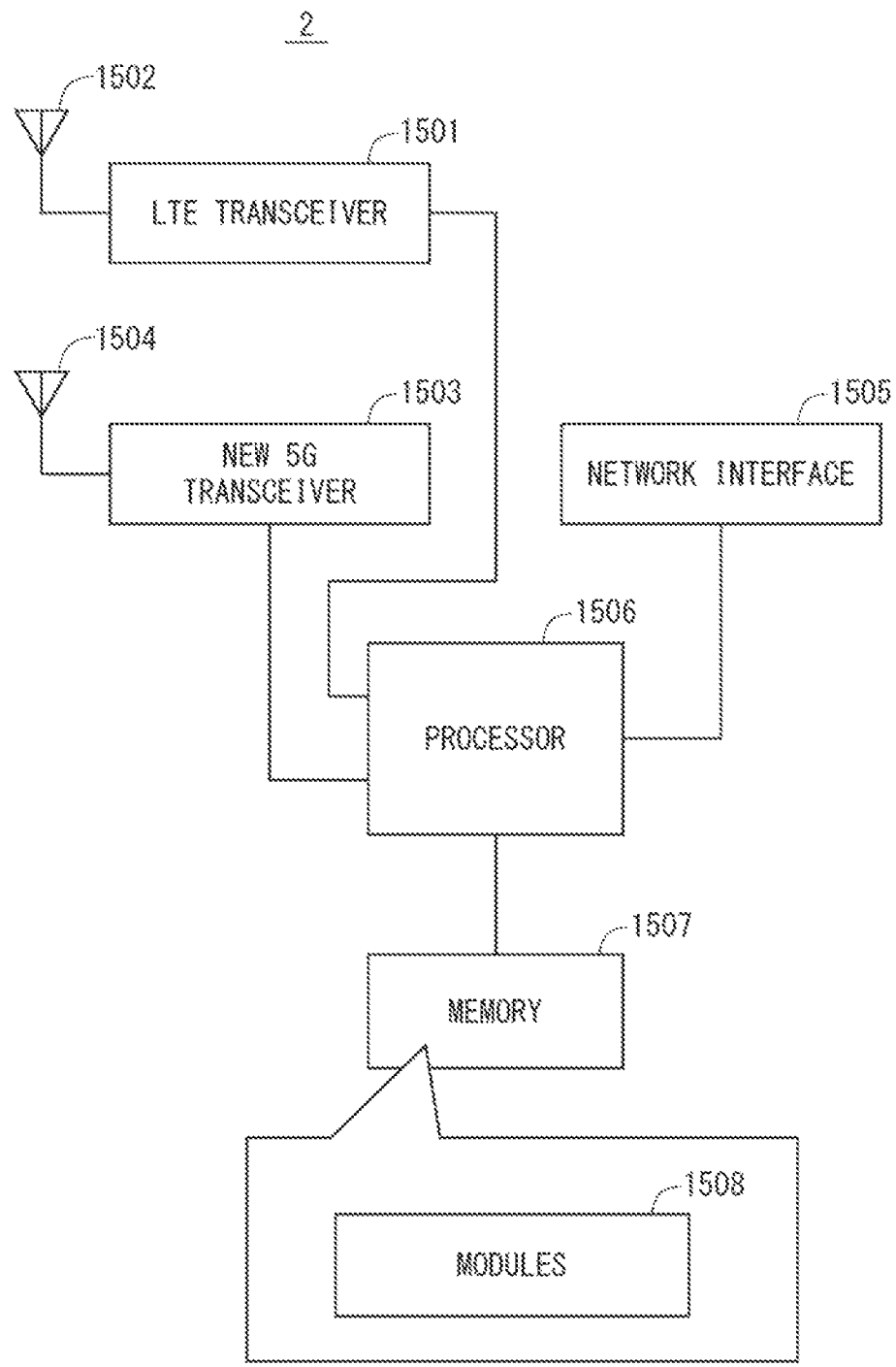
FIG. 15 is a block diagram showing a configuration example of a base station according to the several embodiments.

FIG. 15 is a block diagram showing a configuration example of the integrated eNB 2 according to the above embodiments. Referring to FIG. 15, the eNB 2 includes an LTE transceiver 1501, a New 5G transceiver 1503, a network interface 1505, a processor 1506, and a memory 1507. The LTE transceiver 1501 performs analog RF signal processing regarding the PHY layer of the LTE RAT to communicate with the 5G UE 1 via an LTE cell. The LTE transceiver 1501 may include a plurality of transceivers. The LTE transceiver 1501 is coupled to an antenna 1502 and the processor 1506.

The New 5G transceiver 1503 performs analog RF signal processing regarding the PHY layer of the New 5G RAT to communicate with the 5G UE 1 via a New 5G cell. The New 5G transceiver 1503 is coupled to an antenna 1504 and the baseband processor 1506.

The network interface 1505 is used to communicate with a network node in the integrated EPC 41 or the 5G specific EPC 42 (e.g., a Mobility Management Entity (MME) and a Serving Gateway (S-GW)), and to communicate with other eNBs. The network interface 1505 may include, for example, a network interface card (NIC) conforming to the IEEE 802.3 series.

The processor 1506 performs digital baseband signal processing (i.e., data-plane processing) and control-plane processing for radio communication. In the case of LTE and LTE-Advanced, for example, the digital baseband signal processing performed by the processor 1506 may include signal processing of the PDCP layer, the RLC layer, the MAC layer, and the PHY layer. Further, the control-plane processing performed by the processor 1506 may include processing of the 51 protocol, the RRC protocol, and MAC CEs.

The processor 1506 may include a plurality of processors. The processor 1506 may include, for example, a modem processor (e.g., DSP) that performs the digital baseband signal processing and a protocol stack processor (e.g., a CPU or an MPU) that performs the control-plane processing.

The memory 1507 is composed of a combination of a volatile memory and a non-volatile memory. The volatile memory is, for example, an SRAM, a DRAM, or a combination thereof. The non-volatile memory is, for example, an MROM, a PROM, a flash memory, a hard disc drive, or a combination thereof. The memory 1507 may include a storage located apart from the processor 1506. In this case, the processor 1506 may access the memory 1507 via the network interface 1505 or an I/O interface (not shown).

The memory 1507 may store a software module(s) (computer program(s)) 1508 including instructions and data for performing processing by the integrated eNB 2 described in the above embodiments. In some implementations, the processor 1506 may be configured to load the software module(s) 1508 from the memory 1507 and execute the loaded software module(s), thereby performing processing of the integrated eNB 2 described in the above embodiments.

The configurations of the LTE+ eNB 5 and the 5G specific eNB 6 may be similar to the configuration of the integrated eNB 2 shown in FIG. 15. However, the LTE+ eNB 5 does not need to include the New 5G transceiver 1503 and the 5G specific eNB 6 does not need to include the LTE transceiver 1501.

As described above with reference to FIGS. 14 and 15, each of the processors included in the 5G UE 1, the integrated eNB 2, the LTE+ eNB 5, and the 5G specific eNB 6 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

Each of the above-described embodiments may be used individually, or two or more embodiments may be appropriately combined with one another.

The base stations, the integrated eNB 2, the LTE+ eNB 5, the 5G specific eNB 6, the BBU (or the DU), and the RRH (or the RU) described in the above embodiments each may be referred to as a radio station or a radio access network (RAN) node. In other words, the processing and the operations performed by the base stations, the base station system, the integrated eNB 2, the LTE+ eNB 5, the 5G specific eNB 6, the BBU (DU), or the RRH (RU) described in the above embodiments may be provided by any one or more radio stations (i.e., RAN nodes).

Some of the above embodiments provide the examples in which the radio station (e.g., the integrated eNB 2, the LTE+ eNB 5, or the 5G specific eNB 6) maps a radio bearer of the UE 1 to one or more specific cells on a cell-by-cell basis. In one example, the radio bearer may be mapped, on a cell-group basis, to a plurality of specific cells on which uplink control information (UCI) is transmitted (i.e., PUCCH CG), or to specific cells regarding the uplink transmission timing (i.e., TAG).

Further or alternatively, the radio station (e.g., the integrated eNB 2, the LTE+ eNB 5, or the 5G specific eNB 6) may determine, on a cell-by-cell basis, a specific cell to which each data-packet flow (e.g., IP flow, Service Data Flow (SDF)) transmitted on one radio bearer is mapped. In order to achieve this, the core network (e.g., the P-GW or the S-GW) may add identification information (e.g., flow identification information) for specifying the data packet flow to user plane data to be transmitted to the radio station (e.g., the integrated eNB 2, the LTE+ eNB 5, or the 5G specific eNB 6). The radio station may map the data packet flow to a specific cell on a cell-by-cell basis based on the flow identification information. In other words, the radio station may select on a cell-by-cell basis, based on the flow identification information, a specific cell on which data of the data packet flow is to be transmitted. In a similar way, the access stratum (AS) layer of the 5G UE 1 may receive, from the application layer or the NAS layer, user plane data to which the flow identification information has been added, and then map the data packet flow to a specific cell on a cell-by-cell basis based on the flow identification information. In other words, the AS layer of the UE 1 may select on a cell-by-cell basis, based on the flow identification information, a specific cell on which data of the data packet flow is to be transmitted. The flow identification information may be newly defined. Alternatively, a Flow Priority Indicator (FPI) may be used as the flow identification information. The FPI indicates a priority among a plurality of data packet flows in one particular bearer (e.g., an EPS-bearer).

Further, the above-described embodiments are merely examples of applications of the technical ideas obtained by the inventors. Needless to say, these technical ideas are not limited to the above-described embodiments and various modifications can be made thereto.

For example, the whole or part of the above embodiments can be described as, but not limited to, the following supplementary notes.

(Supplementary Note 1)
A radio station system comprising:
one or more radio stations configured to:
provide a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks;
select from the one or more first cells and the one or more second cells, on a cell-by-cell basis, at least one specific cell on which the radio terminal is allowed to perform at least one of data transmission and data reception on a radio bearer used for uplink transmission or downlink transmission or both via the common PDCP layer; and
transmit configuration information indicating the at least one specific cell to the radio terminal.

(Supplementary Note 2)
The radio station system according to Supplementary Note 1, wherein
the configuration information comprises a bearer configuration regarding the radio bearer, and
the bearer configuration comprises an indication indicating, on a cell-by-cell basis, the at least one specific cell on which the radio terminal is allowed to perform the data transmission on the radio bearer.

(Supplementary Note 3)
The radio station system according to Supplementary Note 1, wherein
the configuration information comprises a cell configuration regarding at least one serving cell, and
the cell configuration indicates whether the radio terminal is allowed to perform the data transmission on the radio bearer in each serving cell.

(Supplementary Note 4)
The radio station system according to any one of Supplementary Notes 1 to 3, wherein each of the first and second radio protocol stacks comprises a Radio Link Control (RLC) layer that provides a service for the common PDCP layer and a Medium Access Control (MAC) layer that provides a service for the RLC layer.

(Supplementary Note 5)
The radio station system according to any one of Supplementary Notes 1 to 4, wherein the one or more first cells and the one or more second cells are cells that have been configured for the radio terminal and have been activated.

(Supplementary Note 6)
The radio station system according to any one of Supplementary Notes 1 to 5, wherein the common PDCP layer is configured to:
provide a first radio bearer that uses the first radio protocol stack, and provide a second radio bearer that uses the second radio protocol stack; and
derive a temporary key for ciphering or deciphering of data of the first radio bearer from a first key, and derive a temporary key for ciphering or deciphering of data of the second radio bearer from a second key that differs from the first key.

(Supplementary Note 7)
The radio station system according to Supplementary Note 6, wherein the common PDCP layer is configured to:
provide an integrated radio bearer that uses both the first and second radio protocol stacks; and
derive a temporary key for ciphering or deciphering of data of the integrated radio bearer from the first key.

(Supplementary Note 8)

The radio station system according to Supplementary Note 6, wherein the common PDCP layer is configured to:
provide an integrated bearer that uses both the first and second radio protocol stacks; and
derive, from the first key, a temporary key for ciphering or deciphering of data of the integrated radio bearer transferred via the first radio protocol stack, and derive, from the second key, a temporary key for ciphering or deciphering of data of the integrated radio bearer transferred via the second radio protocol stack.

(Supplementary Note 9)

A method in a radio station system comprising one or more radio stations, the method comprising:
providing a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks;
selecting from the one or more first cells and the one or more second cells, on a cell-by-cell basis, at least one specific cell on which the radio terminal is allowed to perform at least one of data transmission and data reception on a radio bearer used for uplink transmission or downlink transmission or both PDCP layer; and
transmitting configuration information indicating the at least one specific cell to the radio terminal.

(Supplementary Note 10)

A non-transitory computer readable medium storing a program for causing a computer to perform a method in a radio station system comprising one or more radio stations, the method comprising:
providing a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks;
selecting from the one or more first cells and the one or more second cells, on a cell-by-cell basis, at least one specific cell on which the radio terminal is allowed to perform at least one of data transmission and data reception on a radio bearer used for uplink transmission or downlink transmission or both via the common PDCP layer; and
transmitting configuration information indicating the at least one specific cell to the radio terminal.

(Supplementary Note 11)

A radio terminal comprising:
a memory; and
at least one processor coupled to the memory and configured to:
provide a first radio protocol stack to communicate with a radio station on one or more first cells in accordance with a first radio access technology, a second radio protocol stack to communicate with the radio station on one or more second cells in accordance with a second radio access technology, and a common Packet Data Convergence Protocol (PDCP) layer associated with both the first and second radio protocol stacks;
receive, from the radio station, configuration information indicating, on a cell-by-cell basis, at least one specific cell on which the radio terminal is allowed to perform at least one of data transmission and data reception on a radio bearer used for uplink transmission or downlink transmission or both via the common PDCP layer; and
perform at least one of the data transmission and the data reception on the radio bearer via the at least one specific cell in accordance with the configuration information.

(Supplementary Note 12)

The radio terminal according to Supplementary Note 11, wherein
the configuration information comprises a bearer configuration regarding the radio bearer, and
the bearer configuration comprises an indication indicating, on a cell-by-cell basis, the at least one specific cell on which the radio terminal is allowed to perform the data transmission on the radio bearer.

(Supplementary Note 13)

The radio terminal according to Supplementary Note 11, wherein
the configuration information comprises a cell configuration regarding at least one serving cell, and
the cell configuration indicates whether the radio terminal is allowed to perform the data transmission on the radio bearer in each serving cell.

(Supplementary Note 14)

The radio terminal according to any one of Supplementary Notes 11 to 13, wherein each of the first and second radio protocol stacks comprises a Radio Link Control (RLC) layer that provides a service for the common PDCP layer and a Medium Access Control (MAC) layer that provides a service for the RLC layer.

(Supplementary Note 15)

The radio terminal according to Supplementary Note 14, wherein
the at least one processor is further configured to provide an integrated Radio Resource Control (RRC) layer, and
the common RRC layer is configured to control the common PDCP layer and respective MAC layers of the first and second radio protocol stacks, in order to indicate the at least one specific cell used for the data transmission on the radio bearer.

(Supplementary Note 16)

The radio terminal according to Supplementary Note 15, wherein
the radio bearer is an integrated radio bearer that uses both the first and second radio protocol stacks, and
the control on the common PDCP layer by the common RRC layer comprises indicating which one of the RLC layers of the first and second radio protocol stacks the common PDCP layer should send the uplink PDCP protocol data units (PDUs) to.

(Supplementary Note 17)

The radio terminal according to Supplementary Note 15 or 16, wherein the control on each MAC layer by the common RRC layer comprises indicating a specific cell which the MAC entity should multiplex RLC PDUs into an uplink transport block of.

(Supplementary Note 18)

The radio terminal according to any one of Supplementary Notes 11 to 17, wherein each of the one or more first cells and the one or more second cells is a cell that have been configured for the radio terminal and have been activated.

(Supplementary Note 19)

The radio terminal according to any one of Supplementary Notes 11 to 18, wherein the common PDCP layer is configured to:
provide a first radio bearer that uses the first radio protocol stack, and provide a second radio bearer that uses the second radio protocol stack; and
derive a temporary key for ciphering or deciphering of data of the first radio bearer from a first key, and derive a temporary key for ciphering or deciphering of data of the second radio bearer from a second key that differs from the first key.

(Supplementary Note 20)

The radio terminal according to Supplementary Note 19, wherein the common PDCP layer is configured to:
provide an integrated radio bearer that uses both the first and second radio protocol stacks; and
derive a temporary key for ciphering or deciphering of data of the integrated radio bearer from the first key.

(Supplementary Note 21)

The radio terminal according to Supplementary Note 19, wherein the common PDCP layer is configured to:
provide an integrated bearer that uses both the first and second radio protocol stacks; and
derive, from the first key, a temporary key for ciphering or deciphering of data of the integrated radio bearer transferred via the first radio protocol stack, and derive, from the second key, a temporary key for ciphering or deciphering of data of the integrated radio bearer transferred via the second radio protocol stack.

(Supplementary Note 22)

A method in a radio terminal, the method comprising:
providing a first radio protocol stack to communicate with a radio station on one or more first cells in accordance with a first radio access technology, a second radio protocol stack to communicate with the radio station on one or more second cells in accordance with a second radio access technology, and a common Packet Data Convergence Protocol (PDCP) layer associated with both the first and second radio protocol stacks;
receiving, from the radio station, configuration information indicating, on a cell-by-cell basis, at least one specific cell on which the radio terminal is allowed to perform at least one of data transmission and data reception on a radio bearer used for uplink transmission or downlink transmission or both via the common PDCP layer; and
performing at least one of the data transmission and the data reception on the radio bearer via the at least one specific cell in accordance with the configuration information.

(Supplementary Note 23)

A non-transitory computer readable medium storing a program for causing a computer to perform a method in a radio terminal, the method comprising:
providing a first radio protocol stack to communicate with a radio station on one or more first cells in accordance with a first radio access technology, a second radio protocol stack to communicate with the radio station on one or more second cells in accordance with a second radio access technology, and a common Packet Data Convergence Protocol (PDCP) layer associated with both the first and second radio protocol stacks;
receiving, from the radio station, configuration information indicating, on a cell-by-cell basis, at least one specific cell on which the radio terminal is allowed to perform at least one of data transmission and data reception on a radio bearer used for uplink transmission or downlink transmission or both via the common PDCP layer; and
performing at least one of the data transmission and the data reception on the radio bearer via the at least one specific cell in accordance with the configuration information.

(Supplementary Note 24)

A radio terminal comprising:
a memory; and
at least one processor coupled to the memory, wherein
the at least one processor is configured to provide a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks,
the common PDCP layer is configured to provide an integrated radio bearer that uses both the first and second radio protocol stacks for an upper layer, and
the at least one processor is configured to determine which one of the first and second radio protocol stacks is to be used for transmission of uplink PDCP protocol data units (PDUs) regarding the integrated radio bearer, while taking into account a difference in time-domain characteristics between the one or more first cells and the one or more second cells.

(Supplementary Note 25)

A method in a radio terminal, the method comprising:
providing a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks, the common PDCP layer providing an integrated radio bearer that uses both the first and second radio protocol stacks for an upper layer; and
determining which one of the first and second radio protocol stacks to be used for transmission of uplink PDCP protocol data units (PDUs) regarding the integrated radio bearer, while taking into account a difference in time-domain characteristics between the one or more first cells and the one or more second cells.

(Supplementary Note 26)

A non-transitory computer readable medium storing a program for causing a computer to perform a method in a radio terminal, the method comprising:
providing a first radio protocol stack to communicate with a radio terminal on one or more first cells in accordance with a first radio access technology, a second radio protocol stack to communicate with the radio terminal on one or more second cells in accordance with a second radio access technology, and a common Packet Data Convergence Protocol (PDCP) layer associated with both the first and second radio protocol stacks, the common PDCP layer providing an integrated radio bearer that uses both the first and second radio protocol stacks for an upper layer; and
determining which one of the first and second radio protocol stacks to be used for transmission of uplink PDCP protocol data units (PDUs) regarding the integrated radio bearer, while taking into account a difference in time-domain characteristics between the one or more first cells and the one or more second cells.

REFERENCE SIGNS LIST

1 RADIO TERMINAL (5G UE)
2 BASE STATION (INTEGRATED eNB)
1401 LTE TRANSCEIVER
1403 NEW 5G TRANSCEIVER
1405 BASEBAND PROCESSOR
1406 APPLICATION PROCESSOR
1408 MEMORY
1501 LTE TRANSCEIVER
1503 NEW 5G TRANSCEIVER
1506 PROCESSOR
1507 MEMORY

The invention claimed is:

1. A method performed by a user equipment, the method comprising:
   communicating with a second base station of a second radio access technology;
   receiving information from the second base station,
   wherein the second base station is associated with a second Cell Group (CG) in Dual Connectivity,
   wherein the Dual Connectivity is performed by a first base station of a first radio access technology and the second base station,
   wherein the first base station is associated with a first CG in the Dual Connectivity,
   wherein the information indicates at least one cell of the second CG, and
   wherein data transmission of a radio bearer uses the at least one cell.

2. The method according to claim 1, further comprising:
   controlling, based on the information, the data transmission via the at least one cell.

3. The method according to claim 1,
   wherein the at least one cell is used for the data transmission via a Packet Data Convergence Protocol (PDCP) layer,
   wherein the PDCP layer is associated with a first Radio Link Control (RLC) layer and a second RLC layer,
   wherein the first RLC layer is associated with the first radio access technology, and
   wherein the second RLC layer is associated with the second radio access technology.

4. The method according to claim 1,
   wherein the at least one cell is used for the data transmission via a Packet Data Convergence Protocol (PDCP) entity,
   wherein the PDCP entity is associated with a first Radio Link Control (RLC) entity and a second RLC entity,
   wherein the first RLC entity is associated with the first radio access technology, and
   wherein the second RLC entity is associated with the second radio access technology.

5. The method according to claim 4,
   wherein the PDCP entity is associated with a split bearer.

6. The method according to claim 1,
   wherein the first radio access technology is an LTE or LTE-Advanced radio access technology, and
   wherein the second radio access technology is a 5G radio access technology.

7. The method according to claim 1,
   wherein the first CG is a master CG (MCG) in the Dual Connectivity, and
   wherein the second CG is a secondary CG (SCG) in the Dual Connectivity.

8. The method according to claim 1,
   wherein the receiving the information from the second base station includes receiving the information from the second base station directly.

9. A method performed by a second base station of a second radio access technology, the method comprising:
   communicating with a user equipment; and
   transmitting information to the user equipment,
   wherein the second base station is associated with a second Cell Group (CG) in Dual Connectivity,
   wherein the Dual Connectivity is performed by a first base station of a first radio access technology and the second base station,
   wherein the first base station is associated with a first CG in the Dual Connectivity,
   wherein the information indicates at least one cell of the second CG, and
   wherein data transmission of a radio bearer uses the at least one cell.

10. The method according to claim 9,
    wherein the at least one cell is used for the data transmission via a Packet Data Convergence Protocol (PDCP) layer,
    wherein the PDCP layer is associated with a first Radio Link Control (RLC) layer and a second RLC layer,
    wherein the first RLC layer is associated with the first radio access technology, and
    wherein the second RLC layer is associated with the second radio access technology.

11. The method according to claim 9,
    wherein the at least one cell is used for the data transmission via a Packet Data Convergence Protocol (PDCP) entity,
    wherein the PDCP entity is associated with a first Radio Link Control (RLC) entity and a second RLC entity,
    wherein the first RLC entity is associated with the first radio access technology, and
    wherein the second RLC entity is associated with the second radio access technology.

12. The method according to claim 11,
    wherein the PDCP entity is associated with a split bearer.

13. The method according to claim 9,
    wherein the first radio access technology is an LTE or LTE-Advanced radio access technology, and
    wherein the second radio access technology is a 5G radio access technology.

14. The method according to claim 9,
    wherein the first CG is a master CG (MCG) in the Dual Connectivity, and
    wherein the second CG is a secondary CG (SCG) in the Dual Connectivity.

15. The method according to claim 9,
    wherein the transmitting the information to the user equipment includes transmitting the information to the user equipment directly.

16. A user equipment comprising:
    at least one memory; and
    at least one hardware processor coupled to the at least one memory,
    wherein the at least one hardware processor is configured to:
    communicate with a second base station of a second radio access technology;
    receive information from the second base station, wherein the second base station is associated with a second Cell Group (CG) in Dual Connectivity, wherein the Dual Connectivity is performed by a first base station of a first radio access technology and the second base station, wherein the first base station is associated with a first CG in the Dual Connectivity, wherein the information indicates at least one cell of the second CG, and wherein data transmission of a radio bearer uses the at least one cell.

17. A second base station of a second radio access technology comprising:
   at least one memory; and
   at least one hardware processor coupled to the at least one memory,
   wherein the at least one hardware processor is configured to:
      communicate with a user equipment; and
      transmit information to the user equipment,
   wherein the second base station is associated with a second Cell Group (CG) in Dual Connectivity,
   wherein the Dual Connectivity is performed by a first base station of a first radio access technology and the second base station,
   wherein the first base station is associated with a first CG in the Dual Connectivity,
   wherein the information indicates at least one cell of the second CG, and
   wherein data transmission of a radio bearer uses the at least one cell.

* * * * *